(12) United States Patent  
Riggs

(10) Patent No.: US 9,098,878 B2  
(45) Date of Patent: *Aug. 4, 2015

(54) STRATIFIED COMPOSITE PORTFOLIOS OF INVESTMENT SECURITIES

(71) Applicant: Locus LP, Hamilton (BM)

(72) Inventor: Rory Riggs, New York, NY (US)

(73) Assignee: Locus, LP, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/604,197

(22) Filed: Jan. 23, 2015

(65) Prior Publication Data

US 2015/0134568 A1    May 14, 2015

Related U.S. Application Data

(63) Continuation-in-part of application No. 14/216,936, filed on Mar. 17, 2014, now Pat. No. 8,990,268.

(60) Provisional application No. 61/930,807, filed on Jan. 23, 2014, provisional application No. 61/802,245, filed on Mar. 15, 2013.

(51) Int. Cl.  
*G06F 17/30* (2006.01)  
*G06Q 40/06* (2012.01)

(52) U.S. Cl.  
CPC .......... *G06Q 40/06* (2013.01); *G06F 17/30289* (2013.01); *G06F 17/30601* (2013.01)

(58) Field of Classification Search  
CPC ................. G06F 17/30289; G06F 17/30601; G06F 17/30424; G06Q 40/06  
USPC ................................................ 707/748, 803  
See application file for complete search history.

(56) References Cited

U.S. PATENT DOCUMENTS

| | | | |
|---|---|---|---|
| 7,685,083 B2 * | 3/2010 | Fairweather | 706/45 |
| 8,412,609 B2 * | 4/2013 | Lockwood et al. | 705/36 R |
| 8,473,911 B1 * | 6/2013 | Baxter | 717/123 |
| 2002/0198885 A1 * | 12/2002 | Streepy, Jr. | 707/100 |
| 2007/0061266 A1 * | 3/2007 | Moore et al. | 705/51 |
| 2007/0162412 A1 * | 7/2007 | Percy | 707/1 |
| 2010/0169758 A1 * | 7/2010 | Thomsen | 715/212 |

* cited by examiner

*Primary Examiner* — Jorge A Casanova

(57) ABSTRACT

A stratified composite portfolio can be formed by selecting a group of investment securities, stratifying them according to attributes that correlate to a specific asset risk, and assigning relative portfolio weights to the components based on their stratified positions. The attributes are selected from a universe of possible values. Further positive and negative biases can be applied at any arbitrary point or stratified position, including to individual assets, groups of arbitrarily selected assets, or arbitrary stratification positions.

30 Claims, 11 Drawing Sheets

FIG. 3

1. Locus code: enterprise locus is *.*.* A** (real estate)
    A. Locus code: enterprise locus is 2.2.2 A** (real estate developers)
        i.      Locus code: customer locus is F *.*.* *** (consumer real estate developers)
        ii.     Locus code: customer locus is 2.2.2 *** (industrial real estate developers)
    B. Locus code: enterprise locus is 1.3.2 A** (real estate operators)
        i.      Geography: > 50% of properties (by square footage) in North America (North American real estate operators)
        ii.     Geography: > 50% of properties (by square footage) in Europe (European real estate operators)
        iii.    Geography: >50% of properties (by square footage) in Asia (Asian real estate operators)
    C. Locus code: enterprise locus is 3.3.2 A** (REITs/real estate lessors)
        i.      Company fundamentals: Debt/Equity ratio $\leq$ 2 (low-leverage REITs)
        ii.     Company fundamentals: Debt/Equity ratio > 2 (leveraged REITs)
2. Locus code: enterprise locus is 2.2.2 (B1i OR B2i OR B2ii OR BDivDiv) (equipment materials manufacturers)
    A. Locus code: final resource locus is * (2.2.2 or 1.2.2) C (manufacturers of materials for information-processing equipment)
        i.      Company fundamentals: gross sales $\geq$ group 2A average (high-volume manufacturers of materials for information-processing equipment)
        ii.     Company fundamentals: gross sales < group 2A average (low-volume manufacturers of materials for information-processing equipment)
    B. Locus code: final resource locus is not * (2.2.2 or 1.2.2) C (manufacturers of materials for non-information-processing equipment)
        i.      Company fundamentals: number of employees $\leq$ 50 (small manufacturers of materials for non-information-processing equipment)
        ii.     Company fundamentals: number of employees > 50 and $\leq$ 100 (medium manufacturers of materials for non-information-processing equipment)
        iii.    Company fundamentals: number of employees > 100 (large manufacturers of materials for non-information-processing equipment)

FIG. 8A

```
<bar-code> ::===
    <ent-bar-code> "::"
    <int-bar-code> "::"
    <first-int-bar-code> "::"
    <second-int-bar-code> "::"
    <para-cust-bar-code> "::"
    <cust-bar-code> "::"
    <cust-wg-bar-code> "::"
    <cust-dept-bar-code> "::"
    <cust-final-bar-code> "::"
    <cust-sub-bar-code> "::"
    <c-of-c-bar-code> "::"
    <c-of-c-wg-bar-code> "::"
    <c-of-c-dept-bar-code> "::"
    <c-of-c-final-bar-code> "::"
    <c-of-c-sub-bar-code>

<ent-bar-code> ::== <ent-locus> <ent-process-marker> <ent-product-marker> <temp-coord-value>

<temp-coord-value> ::== "First" | "Second"
<ent-product-marker> ::== "Resource-Product" | "Activity-Product"
<ent-process-marker> ::== "In-house" | "Outsourced"

<ent-locus> ::=== <long-locus>
<int-locus> ::=== <long-locus>
<first-int-locus> ::== <long-locus>
<second-int-locus> ::== <long-locus>

<para-cust-locus> ::== <long-locus>
<cust-locus> ::== <long-locus>
<cust-wg-locus> ::== <long-locus>
<cust-dept-locus> ::== <long-locus>
<cust-final-locus> ::== <abbr-locus>
<cust-sub-locus> ::== <abbr-locus>
```

FIG. 8B

```
<c-of-c-locus> ::== <long-locus>
<c-of-c-wg-locus> ::== <long-locus>
<c-of-c-dept-locus> ::== <long-locus>
<c-of-c-final-locus> ::== <abbr-locus>
<c-of-c-sub-locus> ::== <abbr-locus>

<abbr-locus> ::== <subject-resource> <activity> <direct-object-resource>
<long-locus> ::== <subject-resource> <activity> <direct-object-resource> <indirect-object-resource>

<activity> ::=== <verb>
<verb> ::== "Div" | <phase> "." <department> "." <division>

<subject-resource> ::=== "" | <noun>
<direct-object-resource> ::=== <noun>
<indirect-object-resource> ::=== "" | <noun>

<noun> ::== <resource><resource-stage><resource-stage-value> |
        <resource-human><resource-staging-human> |
        <resource-div> |
        <resource><resource-stage-div> |
        <resource><resource-stage><resource-stage-value-div>

<phase> ::== "1" | "2" | "3" | "4"
<department> ::== "1" | "2" | "3"
<division> ::== "1" | "2" | "3"
<resource> ::== "A" | "B" | "C" | "D"
<resource-stage> ::== "1" | "2" | "3" | "4"
<resource-stage-value> ::== "i" | "ii" | "iii"

<resource-human> ::== "F"
<resource-staging-human> ::== "Work" | "Non-Work" | "Both"

<resource-div> ::== "DivDivDiv"
<resource-stage-div> ::== "DivDiv"
<resource-stage-value-div> ::== "Div"
```

STRATIFIED COMPOSITE PORTFOLIOS OF INVESTMENT SECURITIES

CROSS-REFERENCE TO RELATED APPLICATIONS

This application claims the benefit of U.S. Provisional Patent Application No. 61/930,807 filed Jan. 23, 2014, and is also a continuation-in-part of application Ser. No. 14/216,936 filed Mar. 17, 2014, which claims the benefit of U.S. Provisional Application No. 61/802,245 filed Mar. 15, 2013, the contents of all of which are hereby incorporated by reference in their entireties. This application is related to application Ser. No. 14/216,390 filed Mar. 17, 2014, the contents of which are hereby incorporated by reference in its entirety.

FIELD OF THE INVENTION

The present invention relates generally to computerized techniques using a logical data model for constructing a stratified composite portfolio of investment securities.

BACKGROUND OF THE INVENTION

Management of investment portfolios has been the subject of substantial theory and research. Portfolio theory considers how wealth should be invested and how to maximize a portfolio's expected return for a given amount of portfolio risk, or equivalently minimize risk for a given level of expected return, by carefully choosing the proportions of various assets. While a certain rate of return may be expected, the valuation of individual holdings in the portfolio can depart upward or downward from that expected rate of return. This upward and downward variation from the expected value is known as variance, or volatility. Over time, securities, in theory, should have an efficient frontier for expected volatility and return. According to theory, securities with a higher expected risk will have a higher expected return.

The S&P 500 is the largest equity benchmark in the world. Trillions of dollars are either invested in this benchmark or in funds benchmarked to it. Since the yearend 1999, the broad market indices such as the S&P 500 have experienced a long period where the returns on the broad-based equity indices have underperformed. For example, an investor in the S&P 500 at yearend 1999 was down approximately 20% 10 years later at yearend 2010. It was not until late 2012 that the S&P 500 had a positive return for these yearend 1999 investors, including many large pension funds and endowments. During this same period, broad-based funds holding government or corporate debt have had positive returns with corporate debt earning more than government debt during this period. This premium was due to the extra risk of a corporate bond versus a government bond. These markets had their annual ups and downs, but over a reasonable period of time, these securities had both positive returns and differences that would be expected based on risk. Neither of these statements can be made for the equity indices such as the S&P 500 which lost value on an absolute basis and underperformed materially over a long period of time with respect to the less risky indices holding corporate or government debt.

The S&P 500, like most broad market indices, is capitalization-weighted. This means that the weight of an individual company in the index is proportional to its market capitalization relative to the other companies in the index. There are no controls in the S&P 500 to ensure that a single security or groups of securities with a common risk do not become too large a proportion of the portfolio. That is, the type of controls used in scientific fields and engineered processes where population controls are used to limit the influence that one part of a population can have on a total population being measured are not used in the broad market indices. These controls limit both positive and negative influences. In population studies, controls are used to produce a normative model of an underlying population. Because there are no controls in the benchmarks currently used to invest in equity securities, there is no assurance that these historical returns from yearend 1999 to the present are representative of equity securities in general. All that is known is that the weighting strategy (capitalization-weighting without controls) has produced below average returns for long periods of time.

The result of the major indexes since 1999 appears to be inconsistent with the main theories of the pricing of investment securities and the theory of efficient markets. Much of the work on efficient markets followed the pioneering work of Markowitz and Sharpe with later notable additions by others such as Merton. Their theories suggest that individual securities are priced at a level that is expected to produce a risk adjusted return relative to other investment securities and that, by following certain rules, a portfolio of securities has a higher probability of achieving this risk adjusted rate of return in any given period or over several periods. The rules that Markowitz and others proposed were designed to assist investors and managers in the selection of the most efficient portfolio design by analyzing various possible portfolios of the given securities.

By choosing securities that do not 'move' exactly together, the models show investors how to reduce their risk. The foundational model in this area is known as the Mean-Variance Model because it is based on expected returns (mean) and the standard deviation (variance) of the various portfolios. When developing the original mean variance model, Markowitz made the assumptions that a portfolio that gives maximum return for a given risk or minimum risk for a given return is an efficient portfolio. Thus, portfolios are selected using the following rules: (a) From the portfolios that have the same return, the investor will prefer the portfolio with lower risk, and (b) From the portfolios that have the same risk level, an investor will prefer the portfolio with higher rate of return. Although an individual security may underperform for a long period of time, the rules developed for efficient portfolio construction were designed to reduce this probability of underperformance with respect to the portfolio of securities.

One explanation for the inconsistency between modern portfolios and the theoretical portfolios on which the efficient market hypothesis was developed is that modern portfolios are a much greater scale and complexity than the theoretical examples. The theoretical models tend to use individual securities and describe diversification within portfolios consisting of numbers of securities that are in the single digits and low double digits. Many of the foundational papers were written before the mutual fund boom that started in the 1980s expanded in the 1990s following the creation of individual retirement accounts (IRAs) by the Employee Retirement Income Security Act (ERISA) of 1974, as well as the introduction of the first index fund in 1976. The Markowitz paper on portfolio selection published in the Journal of Finance was written in 1952. According to the first shareowner census undertaken by the New York Stock Exchange (NYSE) in 1952, only 6.5 million Americans owned common stock (about 4.2% of the U.S. population). Sharpe's paper, "A Simplified Model for Portfolio Analysis," was written in 1963 and his book, "Portfolio Theory and Capital Markets," was written in 1970, long before the mutual fund boom created by ERISA, globalization and modern technology, and long before investors started to recognize the unique problems of managing such large funds.

Modern portfolios manage trillions of dollars, and, in order to reduce exposure to non-systematic risk, the portfolios require thousands of securities in diverse risk groups. At this scale, building efficient portfolios has been challenging. The absolute scale of investment today by the average institution has grown exponentially. In addition, the underlying population of securities has grown in heterogeneity and complexity. The total investment in the US mutual funds was $13 trillion dollars in 2012. The US public securities is less than 20% of the total global securities by number of companies. In addition, most of the US companies are significantly dependent on the global economy. This diversity and interconnectedness is increasing every year. The need to control for the non-systematic risks imbedded in this portfolio of companies increases every year also.

This leads to several questions: 1) is the time period under which capitalization models are tested too short and should more time be allowed; 2) is the theory wrong in that risk and return are not necessarily correlated; 3) are capitalization-weighted security portfolios an inefficient design and are other examples with controls to contrast with this model needed. Put another way, there is a need for a new normative case for constructing portfolios of investment securities, a case that addresses the complexities of today's companies and the increasing size and diversity of today's funds by applying the methodology and foundational principles of Markowitz and Sharpe to the complexities of today's large-scale funds.

Current systems of classification create difficulties in building new models of potential efficient portfolios of these large-scale modern investment vehicles. These systems, similar to the foundational papers in finance, were created before the advent of large digital databases and are modeled after the databases of the time such as the Dewey Decimal System and Standard Industry Classification System. These systems categorize the entities that classify. Each is a fixed hierarchy in which each entity has a single parent; that parent has a single parent, and so on. Each parent has descriptions, but not concepts of specific intrinsic attributes that would enable an entity under one parent to be related to an entity under another parent. Without this delineation, it is hard to understand the multivariate risks to which companies are exposed and, thus, to see how many companies in a large portfolio may share a similar or related risk. These types of difficulties in classification are becoming increasingly apparent given complexities of today's companies and the increasing size and diversity of today's funds. Despite the fact that one of the biggest risks in a capitalization-weighted strategy is the lack of controls for single risk exposures, bubbles or massive non-systematic price corrections, there are currently limited tools to systematically address these problems. Thus, there is a need for a multivariate classification system enabled by current data processing capable of providing these tools and the ability to build multiple different portfolios to test the efficiency of each and test for a normative case.

Volatility

Volatility in pricing occurs continually with each fluctuation in price. Volatility is a significant factor in portfolio performance and these price fluctuations create a drag on portfolio growth. For example, daily volatility has been shown to hurt the return of leveraged exchange traded funds (ETFs). (See Tony Cooper, *Alpha Generation and Risk Smoothing Using Managed Volatility* (2010)).

In an effort to reduce the effects of volatility on a portfolio, various weighting schemes have been suggested. For example, one method described in U.S. Pat. No. 8,306,892 operates by calculating weights based on market capitalization, gross-domestic product, and geographic region. In another example, described in U.S. Pat. No. 8,131,620, weights a portfolio of securities are based on market capitalization and positive dividend yield. Numerous other portfolio weighting schemes exist. None of these weighting schemes fully realize the Markowitz model, specifically, that normalizing risk/return is statistical process that requires matching the number of securities and the degree of correlation between the specific securities.

Some examples, such as that described in U.S. Pat. No. 8,005,740, use North American Industry Classification System (NAICS) sectors for weighting. Weighting schemes based on NAICS or Global Industry Classification Standard (GICS) relate companies by their positions in a fixed hierarchy. There are two significant limitations of the fixed NAICS and GICS hierarchies: 1) any items without a common parent are unrelated and cannot be compared; 2) any items in the same parent can only be compared along the metrics that GICS or NAICS uses to define that group (insofar as the names of the groups indicate the metric that separates them, e.g., "consumer" vs "commercial" may relate to the customer base).

Without controls, random groups of securities can have periods of significant valuation swings, both up and down, from one time period to another. These massive swings in value may not be caused by variables such as accounting attributes or their designation of as "growth" or "value" stock. Rather, they can be caused by specific intrinsic attributes of the individual companies comprising the groups. The valuation swings could be caused by, for example, companies being long a specific commodity when the commodity suddenly loses its value; there is over-exuberance in the demand prospects for a company's or industry's product and it does not meet demand; they have long fixed-cost contracts and the actual costs available to their competitors changes; or they have over-weighted a certain asset in the product mix and that class loses its value; or other reasons.

There are many reasons for random bubbles. In some cases, they are broad market (also referred to as systematic) bubbles; in others, they are limited to a constituent group (such as an asset class or industry). There are certain events that appeared to be systematic because they created so much bias, e.g., the Internet bubble, but are non-systematic. In either case, the impact to an investor's returns can be extremely negative.

The random walk theory represents the inability to address the apparent randomness of volatility and returns in equity-based investment securities. The random walk theory states that a large random selection of equity-based investment securities will do as well as an actively-managed selection of equity-based securities. The random walk theory is the underlying reason for index funds and the broad support for passive index funds by the academic community. The random walk theory, "[t]aken to its logical extreme . . . means that a blindfolded monkey throwing darts at the stock listings could select a portfolio that would do just as well as one selected by the experts." (B. Malkiel, A Random Walk Down Wall Street, $10^{th}$ ed., 2012)

Many different weighting strategies have been proposed to deal with this problem of random volatility in equity-based investment securities. The recent underperformance of these indices to comparable debt indices has highlighted that these passive indexes are continually plagued by the same randomness hypothesis.

Historically, healthcare was also plagued by a similar randomness problem. In healthcare, this hypothesis was framed as a random patient going to a random doctor having some probability of receiving a random answer. Before modern medicine and modern statistical control groups, many believe that the probability of a random answer was very high. The healthcare industry slowly solved this problem by creating detailed patient profiles and developing statistical methodologies using information from these profiles to control for underlying characteristics of a given population. This work occurred incrementally as each disease area and governmental agencies researched and understood a series of natural biases until a well-developed field specific framework evolved.

The systems and methods described herein can be used in investment management by controlling for specific types of random events that impact the overall randomness of risk and return in investment securities. Random movements in investment securities create a drag on returns, especially large downward movements caused by events such as bankruptcy or the popping of non-systematic bubbles. In both of these cases, there is no expectation that investment securities will rebound to pre-existing levels. In both of these cases, the securities being impacted are being re-priced because of a sudden market recognition that they were overpriced.

Non-systematic bubbles and bankruptcies are associated with non-systematic factors such as the underlying intrinsic attributes of the industries, companies, or assets associated with specific investment securities. A major problem in the risk management of large portfolios of securities is the inability to control for the occurrence of these types of events. If a portfolio inadvertently over-weights in a security or groups of securities that have a common bubble or bankruptcy risk, the returns can be materially impacted by a relatively small number of securities in the portfolio. In several cases, over-weighting in specific non-systematic variables has caused systematic-like impacts on a portfolio. This was clearly the case of the Internet bubble. In calendar year 2000, the capitalization-weighted S&P 500 was down 9.09%. It was one of the worst years in S&P 500 history. In that year, there were 16 stocks that were down 49.8%, while the rest of the market was up 4.28%. Unfortunately for investors, these 16 companies, which were all in the business of moving, storing, or processing information, were 24.8% of the total portfolio.

The prior efforts to improve portfolio returns appear to have at least two problems: 1) a sub-optimal number of groups, and 2) no ability to control for variance or correlation between groups or within each group to ensure that each group operates in a predictable group-specific way. Existing large-scale heterogeneous portfolios of securities have insufficient controls on their constituent groups and neither capitalization-weighting nor even weighting solves the problem of population control.

Problems of Scale

For multiple reasons, the problems described above are particularly acute in large-scale portfolios of securities. Without both a reliable and validated system of attributes as well as a stratification system that uses a stratified composite hierarchy, it is exceptionally difficult to control for the different attributes associated with the securities. Various example reasons why management at scale is difficult are provided below.

(a) Charter limits on ownership: For many funds and fund managers, there are limits on the percentage of a company they can own. For example at 5% holdings, there are 13-D filings and oversight. Many funds will not or cannot cross that threshold.

(b) Liquidity limits on ownership: The more a fund owns of an individual security, the harder it is to sell depending on the liquidity of the shares. In addition, because of size, many funds have absolute dollar or dollar-equivalent limits on ownership. If a fund has $50 billion to invest, a $1 million investment might be considered too small.

(c) Large funds need a large number of securities to fill out a portfolio: Due to the factors identified above as well as other practical issues, a large fund needs a large number of companies to invest in due to liquidity and ownership issues. Across an economic system, there are many linkages and the larger the number of companies, the harder it is to track and oversee the potential linkages and risks that come from these linkages. A major part of these linkages are due to non-systematic attributes associated with, among other things, a company's suppliers, products, industry, operations, geographic location, etc. It is very easy for portfolios with a large number of securities to become over concentrated in non-systematic risk categories. Understanding the different potential risk groups and controlling for them is difficult without both a reliable and validated system of attributes as well as a stratified composite hierarchy to control for the different attributes.

(d) The fact that investors do not pick the universe of qualified companies to invest in: Due to the factors identified above as well as many more practical issues, large funds need to invest in large companies. The available companies in this group vary from time to time. In addition, from time to time, these securities have variable weights and aggregate differently depending on what companies exist in which category at any given point in time. In addition to changes over time, this industry, sector, or company selection varies by geography. In fact, sector differentiation may be a greater cause of price movements between geographies than the underlying currency that drives the products. For example, a US portfolio is much heavier in technology stocks than Europe of Latin America. Europe and Latin America are relatively heavy in commodities and raw materials. If a fund manager's goal is currency differentiation, it is important to control for these sector variations. First understanding the different potential risk groups that exist at any given point in time and in any specific geography or category, and then being able to control for them is difficult using currently known techniques.

(e) Attribute risk is multi-dimensional, as is the risk of concentration: Single and multiple attributes are helpful in distinguishing risks in individual companies. For example, identifying that a company is in the semi-conductor business is a differentiable risk. Furthermore, the type of semi-conductor (e.g., storage, processing, linking) is important, as are the raw materials required and the identities of the customers. These varied yet critical factors are often aggregated into one category in large-scale funds. The existing categories in current systems tend to be standardized on a global basis and are unable to differentiate between these factors. The inability to represent linked multi-attribute risks is a significant limitation for existing large-scale investment portfolios.

If portfolios, and large-scale portfolios in particular, are not better controlled, non-systematic events can appear to have systematic impact. Examples of non-systematic events are provided below. Known and existing systems do not address the underlying statistical causes for the systematic impact of the random volatility of the constituents of large-scale portfolios of securities. With improved controls, however, the impact of non-systematic events could be limited.

BRIEF SUMMARY OF THE INVENTION

A stratified composite portfolio can be formed by selecting a group of investment securities, stratifying the securities into components according to attributes that correlate to one or more identified investment security risks, and assigning relative portfolio weights to the components based on their stratified positions. The attributes can be selected from a universe of possible values. Further positive and negative biases can be applied at any arbitrary point or stratified position, including to individual investment securities, groups of arbitrarily selected investment securities, or arbitrary stratification positions.

The specific attributes associated with the investment securities can be used to stratify the investment securities and weight the holdings of investment securities in a portfolio by assigning specific weights to the risk groups in which the underlying securities are held to meet any risk objectives of the overall portfolio. For example, one of the goals in stratifying risk groups may be to reduce the impact of attribute-specific volatility drag on the portfolio as a whole.

Multi-attribute risk composites can provide a tool to manage risk by reducing or minimizing the potential risk from these attributes and/or increasing or maximizing the potential return from these type of risks by engineering the composite to take advantage of an event a manager expects to happen.

In some embodiments, a stratified composite portfolio can be created by tagging securities with risk attributes based on attributes intrinsic to the investment securities and applying a weighting scheme that limits the exposure to individual attributes. The result of this process is a weighted portfolio that stratifies risk across a number of risk attribute categories, and stratifies the risk in the individual groups and sub-groups according to attribute categories within groups, to achieve a desired risk profile that can be represented by a target score.

BRIEF DESCRIPTION OF THE DRAWINGS

FIG. 3 illustrates an example stratification with three levels.

FIGS. 8A-8B illustrate an example syntax represented as statements defining a hierarchy and barcode.

DETAILED DESCRIPTION

Introduction to Risk

Figure 1:
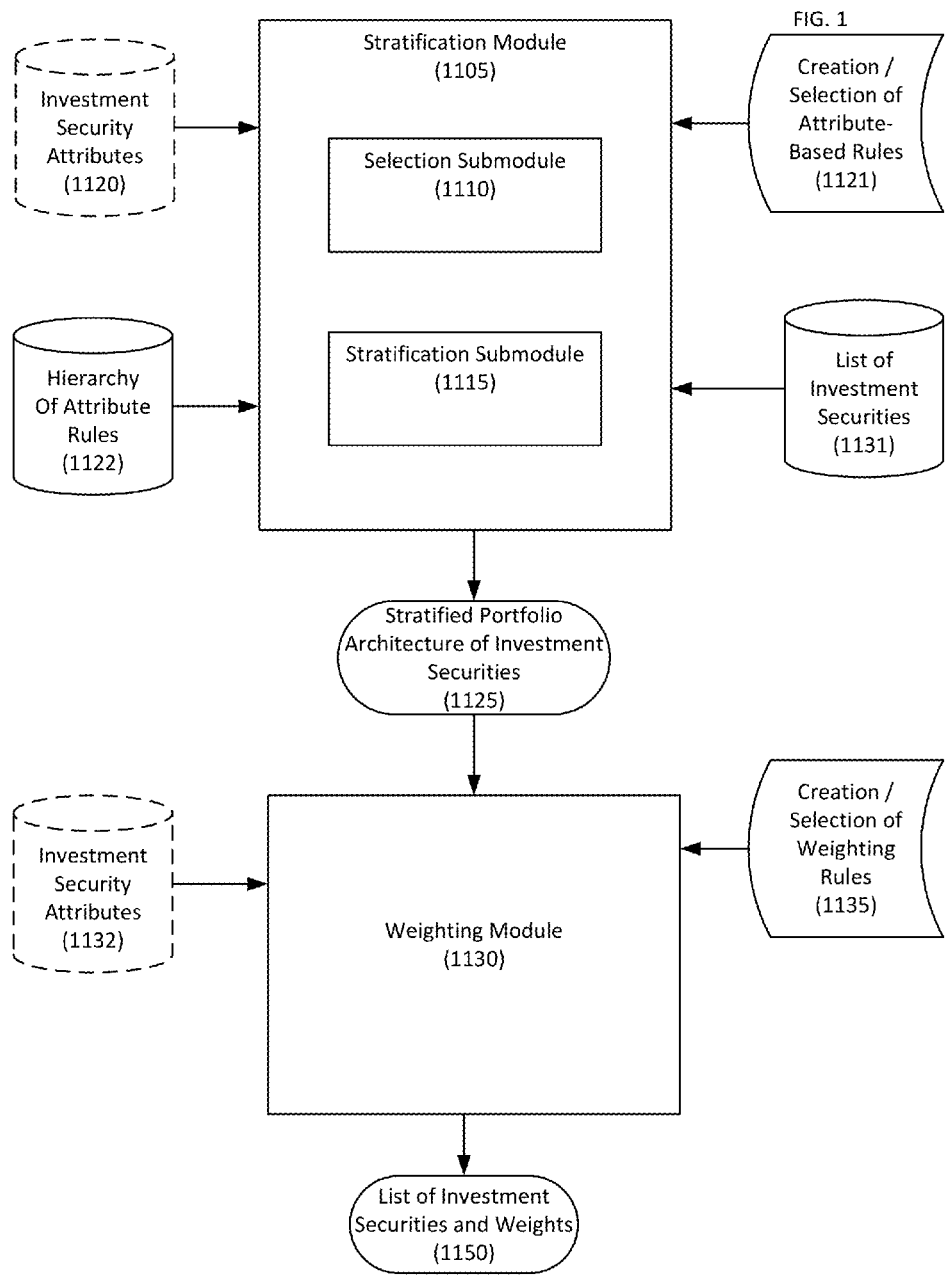
FIG. 1 illustrates an example method for creating a stratified composite portfolio and weighting investment securities.

Securities are financial instruments that represent an ownership position in a publicly traded corporation (stock), a creditor relationship with governmental body or a corporation (bond), or rights to ownership as represented by an option. A security is a fungible, negotiable financial instrument that represents a type of financial value. The company or entity that issues the security is known as the issuer. The price of a security is based on its expected return over the time of ownership. The expected return is, in turn, based on the expected qualities and performance of the underlying entity associated with the security.

Investments in investment properties are made with an expectation of appreciation or return and of potential risk, or variance of these returns. Investment securities have two primary performance measures: rate of return and the probability or risk of achieving an expected rate of return in specified period of time. The two measures are linked: the higher the expected risk, the higher the expected return. Stated differently, higher levels of risk should be compensated for by higher levels of return. The probability of return is linked to the expected variance of outcome for a given investment security. The actual return required for an investment property may be tied to many factors including market conditions, a given supply of investment capital, or an expectation of inflation or deflation. However, for a given market at a given time, the relative rates of returns on investment securities will include risk relative to the type of investment security and the underlying properties or attributes associated with the investment property.

Securities vary in their return characteristics and expectations. Each type of security represents a specific ownership position in a specific company. Each type, such as a bond, an equity instrument or a derivative has its own specific ownership and investment characteristics. The expected return from a security is based on the type of security and its characteristics and the underlying performance of the associated entity relative to the ownership represented by the security. For any security, the expected return and the actual return may be materially different. The variance between expected and actual return is the risk in a security.

There are two primary types of risks in investment securities. A first type, systematic or market risk, refers to events which affect aggregate outcomes such as broad market returns, total economy-wide resource holdings, or aggregate income. In many contexts, events such as earthquakes and major weather catastrophes pose aggregate risks as they affect not only the distribution but also the total amount of resources. A second type, non-systematic (also known as idiosyncratic or business risks), refers to the risk that the entity associated with a security experiences changes in its fortunes or even fails due to any number of factors. Systematic risk relates to the aggregate risk of the general investment area. Non-systematic risk relates to entity-specific risk of the entity in which a security has an ownership position.

An investment security's expected rate of return (and volatility) depends on factors including both market forces and forces tied to the specific investment security and its underlying properties. The former forces are systematic and impact broad classes of securities. The latter are specific and unique to each specific investment security, being tied to the specific attributes of each specific investment security. The variance of investment security returns that are tied to the latter are tied to specific attributes of the specific securities.

Non-Systematic Risk

Non-systematic or business risk is specific to the qualities or attributes of the specific entity with which the security is associated. The changes in fortunes or even bankruptcy of a specific business are related to the intrinsic attributes of the business itself. These include any number of factors including the business, its management/employees, its operations, its products, its customers, their customer's customer, the availability of supplies, the strength of their suppliers or the specific assets or liabilities of the business. Events related to any one of these things or any combination of these things can cause the fortunes of a business to change and, in so doing, change the expected return of a business associated with a security.

In addition to an individual company, a portfolio of securities can be impacted by these non-systematic risks if the portfolio is over-exposed or over-concentrated in a specific non-systematic risk. One of the principal reasons for having a portfolio is to reduce this exposure to non-systematic risk by spreading it out over a number of investments with unique non-systematic risks such that no one non-systematic risk will materially change the fortunes or expected return of the overall portfolio. This strategy is relatively easier for an individual investor who can diversify a portfolio over a relatively small number of individual securities in relatively small amounts. However, this strategy has proven elusive for large-scale investors such as pension funds or endowments that have billions of dollars or dollar equivalents to invest. Those large-scale investors must invest in hundreds or thousands of securities at any given point in time representing billions of dollars of value. For investors with that scale of investment, minimizing the impact of non-systemic risk factors in a portfolio has proven very difficult and they tend to overweight in large industry bubbles and are negatively affected by repeated technology bubbles and continual over-weighting in large bankruptcies or large downgraded classes of financial instruments such as mortgage backed securities. The invention disclosed herein provides a method for portfolio managers to systematically control for these non-systematic portfolio risks that disproportionately and negatively impact large-scale portfolios.

Attributes

The systems described herein can operate by assigning one or more attributes to companies associated with an investment security. The methods described herein can be implemented on a computing device to sub-divide a portfolio of investment securities using the attributes associated with the companies or with investment securities associated with the underlying investment security. These attributes can be used as markers for the specific risks associated with events such as bankruptcy or bubbles. These attributes enable a portfolio manager to stratify or sub-divide a portfolio into groups according to specific attributes, where each group represents a specific attribute-related risk. The hierarchical children of these parent groups have both unique risks between groups and share common risks with their parent.

After stratifying a portfolio, weights can be assigned to the stratified units and a plan to reconstitute the weightings on a systematic basis can be executed. In this way, a portfolio manager can understand and manage the specific risks in the portfolio. Additionally, specific risks can be engineered by arbitrarily setting weights for the stratified units. In some embodiments, the manager can determine the desired risk at the beginning of the process, using these to form a multi-level hierarchy of distinct groups and sub-groups, and then weighting the groups according to a desired risk outcome.

The methods described herein calculate weights for portfolios of investment securities that have specific properties that are different from uncontrolled portfolios of the same investment securities based on investment property-specific attributes. As described in more detail below, the invention uses investment property-specific attributes to reduce the randomness of individual investment property returns by building portfolios of investment securities that reduce the impact of the risks of specific investment property attributes by stratifying the specific attributes and their risks in a controlled manner over a controlled portfolio of population groupings, representing groupings defined by common attributes and groupings containing specific investment securities that share the attributes associated with the grouping.

Stratification

To control for non-systematic risk, a portfolio manager must control for the business-specific risks that exist in any portfolio. These risks could be, among other things, company-related, industry-related, product-related, customer-related or supplier-related. The larger a portfolio becomes, the harder it is for a portfolio manager to understand to what specific non-systematic risks a portfolio is exposed. The methods of risk group stratification described herein reduce the negative impact of an attribute-specific volatility on the portfolio as a whole.

The systems described herein can be used to create a standardized bar code that identifies a multitude of business attributes. The system can assign this standardized bar code with standardized attributes to securities in a portfolio. Based on this bar code of attributes, specific non-systematic risk exposures that exist in a portfolio can be identified and controlled for. Once identified, the method can be used to control for these non-systematic risks by limiting a portfolio's exposure to these risks.

The systems can be used to create a stratified hierarchy of specific risk groups, allocating the securities in a portfolio across these stratified risk groups and selecting the desired exposure to stratified risk groups by applying calculated or user-provided weights for identified non-systematic risks. Thus, stratification can be used to systematically control exposure to non-systematic risks. These exposures can then be managed over time by creating rebalancing rules that reset on an appropriate periodic schedule a portfolio's exposure to these identified non-systematic risks. In this way, a large-scale security portfolio's exposure to a multitude of non-systematic risks can be systematically determined and managed.

Businesses with a common intrinsic attribute or set of attributes correlate with events that are associated with that attribute or set of attributes. The measure of correlation will vary by the level of importance of that attribute in a specific business. For example, if all network equipment companies share the same customers, the loss of a major customer like a Nortel, a giant network company, will impact all the companies. The impact, however, will be greater if Nortel is the company's sole customer than if Nortel is less than 5% of a company's business. In this way, grouping companies in risk groups that are defined by attributes provides a method for portfolio managers to group securities in groups that correlate with specific attribute related events. In addition, most attributes are, in turn, part of larger attribute groups. All the companies that were sharing Nortel were also part of a network equipment group who in turn were part of a communication equipment group who were in turn part of larger digital technology group. In this way, using specific attributes enables a portfolio manager to group securities by both broad and narrow categories and by the importance of these categories on the individual securities.

The process of stratification can include dividing a population into independent subsets (called strata) within which an independent sample from the specific population can be placed. Stratification is an important tool in statistics where it is used to divide a population into parts or subsets (known as strata) for the purpose of creating a sample set of a specific population where an assigned proportion of the sample then being selected comes from each stratum. It is through the creation of defined subsets which are assigned defined proportions that statistics is able to create meaningful controls to population outcomes.

The outcome of the stratified population is called a control group because the constituents and the weights of the subsets are defined and can be tested. In any population, there tends to exist random variances where a subset of the population has different characteristics than the population as a whole. The impact of these aberrant sub-populations can be mitigated by grouping the population into sub-populations that are expected to behave differently and then ensuring that some of each sub-population is used in studying the population as a whole. As an example, if one were studying the output of workers, one might find that workers on Monday morning were less efficient than the rest of the week. However, if one did a random sample of 20 days worked during a year, one might randomly receive a sample set that was abnormally biased toward Mondays. This would not be representative of the workers as the dataset was skewed to the one period when workers were less efficient. In an effort to eliminate this bias, one might stratify the population set across five subsets consisting of one subset for each day of the week. When one did a random sample, one would assign each subset an equal number of worker days so that the entire sample consisted of five subsets each with an equal number of example days. In this way, stratification can limit biases in a sample set and increase the probability of a representative outcome.

Stratification methodologies are common in both instances referenced above. Stratification provides controls that can: 1) ensure an unbiased sample set that is representative of the entire population; or, 2) ensure a specific bias to create an outcome that is desired but not necessarily representative of the underlying population. An example of the former is in clinical trials or experiments in the social sciences. In those cases, the experimenter is attempting to form a representative sample set against which assumptions can be varied to investigate how they impact the controlled population. An example of the latter is in risk management, where different population subsets are uncorrelated and have highly divergent occurrences or variations. In that case, the statistician may want to bias the sample set toward a specific subclass such as subsets that have relatively higher or lower volatility. In both cases, stratification enables the statistician to build sample sets with predictable outcomes based on the type of stratification model being implemented. In stratified sampling, the strata are formed based on members' shared attributes or characteristics. These attributes could be based on relative quantitative metrics of a population, such as size, speed, or age of a population. In addition, the attributes could be based on physically identifiable attributes such as color of hair, skin or eyes, right-handedness or left-handedness.

In the context of investment securities, the value of an investment security can be directly or indirectly related to: 1) the type of assets or operations that are directly or indirectly associated with the security, and/or 2) the specific attributes associated with the assets or operations that are directly or indirectly associated with the security.

The aggregate expected return of a composite portfolio can be determined from the expected returns of each individual investment security and its weight in the composite portfolio. The aggregate volatility of a composite portfolio can be determined from the volatility and weight of individual investment securities and the pairwise correlations of these individual investment securities with one another. Because of this, the overall volatility can be controlled, and reduced, by stratification of the portfolio into groups that have relatively high intra-group correlation and relatively lower inter-group correlation. By dividing the investment securities into correlation clusters, i.e., groupings formed based on shared and unshared attributes that correspond to risks, volatility can be controlled.

DEFINITIONS

Investment Security: As used herein, an investment security is defined as a financial instrument that can represent any or all of: an ownership position in a corporation (stock) or a collection of assets; a creditor relationship with a corporation; an individual or a governmental body secured directly or indirectly by the assets of the issuer (bond); or rights to ownership as represented by an option or other derivative instrument. An investment security may be a fungible, negotiable, financial instrument that represents a type of financial value associated with an entity. Its value can be based on the type of security, the type of relationship with the issuer, and the type of assets and liabilities that are directly or indirectly associated with the security.

Attributes: The entities represented by the investment security can be associated with attributes. The system can recognize multiple types of attributes associated with an entity. As non-exclusive examples, the system can operate on classes of attributes that are: (a) relative-to-universe, or (b) intrinsic. Relative-to-universe attributes may be, for example, scoring systems, designations as high/low volume securities or as growth/value securities. The system can be configured to recognize multiple types of intrinsic attributes. As non-limiting examples, types of intrinsic attributes can be: syntactically structured intrinsic attributes, contextual attributes, accounting attributes, and market-based attributes. Some intrinsic attributes may also be considered to be absolute. An example accounting attribute may be total debt and an example market-based attribute may be market capitalization. Examples of contextual attributes may include: (a) geographic attributes, (b) attributes of assets belonging to the company (e.g., "big container" vs. "small container" for a shipping company), (c) attributes related to the product (e.g., "luxury" vs. "non-luxury" apparel items), (d) attributes related to customers (e.g., a list of specific customers), and (e) attributes related to suppliers (e.g., a list of specific suppliers). The system can recognize any combination of different types of attributes.

Any combination of multiple attributes can be formed as a compound attribute. Any combination of intrinsic attributes can be considered to be a compound intrinsic attribute while any combination of relative attributes or intrinsic and relative attributes together can be formed as a compound relative attribute. Compound attributes can be defined as a new single attribute.

In some cases, attributes can be defined to include attributes relating to the entity associated with the investment security and correspondingly exclude attributes of the investment security itself. For those embodiments, the system can be configured to define attributes so as to specifically exclude attributes relating to: the type of investment security, such as equity, debt or derivative and characteristics of the investment security, such as preference, maturity, duration, or strike price. In those configurations, those excluded attributes are not considered to be attributes because the included attributes relate to the company or assets the investment securities are associated with, not the investment security itself.

In some embodiments, intrinsic attributes can be defined to exclude accounting and performance attributes. The included intrinsic attributes can be essential qualities, features or inherent characteristics of the underlying entity or assets with which an investment security is associated. For example, intrinsic attributes can define what a company does, such as manufacturing or transportation; attributes related to the company's product, such as car, computer, or couch as well as type of car, computer or couch; attributes related to a company's customer such as consumer or business; attributes related to the customer's customer; attributes related to the geographic location of a business or its individual operations; attributes related to the products and materials a company uses to provide its product; attributes related to any of the multivariate industries or industry segments in which a company may operate; attributes related to the structure of a company's business such as integrated, non-integrated, forward integrated, backward integrated or networked; management or strategy such as unique risks based on a company's management, its decisions and strategies; financial leverage; attributes related to any of the multivariate government or macro-economic risks associated with a specific business or country where a business does business; attributes associated with the accounting or business risks identified by a business as core to their business; or risks associated with categorization tied to a specific business or segment by the investment community. At any given point in time, any one of these attribute factors or an industry event related to these attribute factors may affect the risk associated with investment securities associated with entities that have these attributes. While intrinsic attributes can provide a relative ordering or placement, they are not necessarily literal rankings.

In some embodiments, relative-to-universe attributes can be defined to include qualities based on any of: a rating system; a scoring system that compares a ratio-based accounting or performance characteristic of the entity or assets associated with the investment security at a point in time and then groups the investment securities scored by their relative scores; or any system of identification, through any type of scoring system, that would give the same entity, product or asset a different identification value at a different time based its score; and ranking systems. In these systems, the same entity or the same group of assets can be assigned a different value at a different point in time because these systems are point-in-time measurements that group investment securities based on a measurement at a given point in time. The securities that satisfy a category depend on the score of a company or group of assets at that point in time, and not necessarily on the specific underlying business or group of assets being scored.

Stratified Composite Unit: As used herein, a stratified composite unit is defined as a stratified organization for investment securities comprising: 1) a parent group that is defined by one or more attributes where all members of the parent group have in common the attributes used to define the parent group; and 2) at least two sub-groups of the parent group, which may be considered to be children of the parent group and/or siblings of each other. All members of a sub-group have in common the attributes used to define the sub-group. Additionally, all members of the sub-group have in common the attributes used to define the parent group of the sub-group. Any stratified composite units and sub-units in a stratified composite unit can include an arbitrary number of other sub-units that follow the rules of its parent unit or sub-unit. In some cases, a stratified composite unit may be comprised of only a parent group and two sub-units. In other cases, a stratified composite unit may be comprised of as many parts as the size and diversity of the original composite unit parent will support.

Stratified Composite Portfolio: As used herein, a stratified composite portfolio is defined as comprising at least two stratified composite units wherein the attributes of the parents in the composite units represent risk groups so that: 1) parent risk groups have a different risk profile with respect to the other parent risk groups; and, 2) all the sub-units comprising investment securities in risk groups are formed as stratified composite units.

While there may be other qualifications to be in the parent grouping of a stratified composite unit, composite unit parents can satisfy the condition of sharing a specific common attribute or sets of common attributes with the members. A parent grouping of the multiple stratified composite units can comprise a stratified composite portfolio defined to create a portfolio of composite units so that a defined differential risk is addressed by the composite units that comprise the stratified composite portfolio.

Syntactically Structured Attributes

The attributes described above can be represented as a domain-specific syntax which defines the structure of the stratified composite units and stratified composite portfolio. The structures can be defined by the use of domain-specific syntax and domain-specific syntactic positions, including the identification of attributes related to domain-specific data entities that are associated with syntactic positions. Syntactic tags can have relational attributes that enable syntactic positions to be related to each other.

As used herein, syntax can be considered to be a set of rules. A syntactic position is a valid position based on this set of rules. A symbol in a database can be used to mark a data entity. A syntactic tag can be used to mark the association between a symbol and a rule. A syntactic tag associates the data entity marked by a symbol to the other data entities in a domain based on the syntax-established set of rules. This process of syntactic tagging provides a means for relating domain-specific information. It takes information in a domain and tags it with rules that relate it in the domain. Syntactic tags can be dynamic.

Syntactic tags for stratified composite units can be expressions which serve as the labels for tags. Such expressions can conform to a syntax expressible in BNF notation or an equivalent meta-notation. Any expression or sub-expression of the syntax, containing elements which have a range of potential values, may be hierarchically organized, in which case that expression or sub-expression describes a dimension which includes regions and successive sub-regions within the multi-dimensional space. As a default, elements of syntax which are designated as hierarchical are interpreted from left to right according to their positions within the expression, as successive levels from top to bottom within the hierarchy.

The syntax can represent hierarchical coordinates that provide successive specialization; the degree of specialization increases with the depth of the hierarchy. The syntax can also provide step-wise serialization at multiple levels; the degree of serialization increases with the number of elements at successive levels.

In addition, at successive levels of specialization and/or degree of serialization, the syntax elements share a proximate syntactic position with both:

a) their parent in the hierarchy; and b) their siblings in analogous positions across different hierarchies in the same syntax in the same domain.

Syntax elements may be considered to have a proximate syntactic position if they are relatively close to other elements based on either their hierarchical specialization or serial positions. These relationships allow for comparison of values across syntactic positions. As a default, elements of syntax which are designated as hierarchical are organized alphabetically and/or numerically within a given level of a hierarchy.

Syntactic tagging of the attributes links data entities with shared attributes by assigning data entities to an element in the set of common syntactic tags. The syntactic tags associate data entities with the other data entities in a domain according to their syntactic associations. Thus, they inherently group and/or cluster data entities that share syntactic tags. In some cases, syntactic tags can be used to create a normative model for a portfolio, discussed in more detail below.

Figure 9:
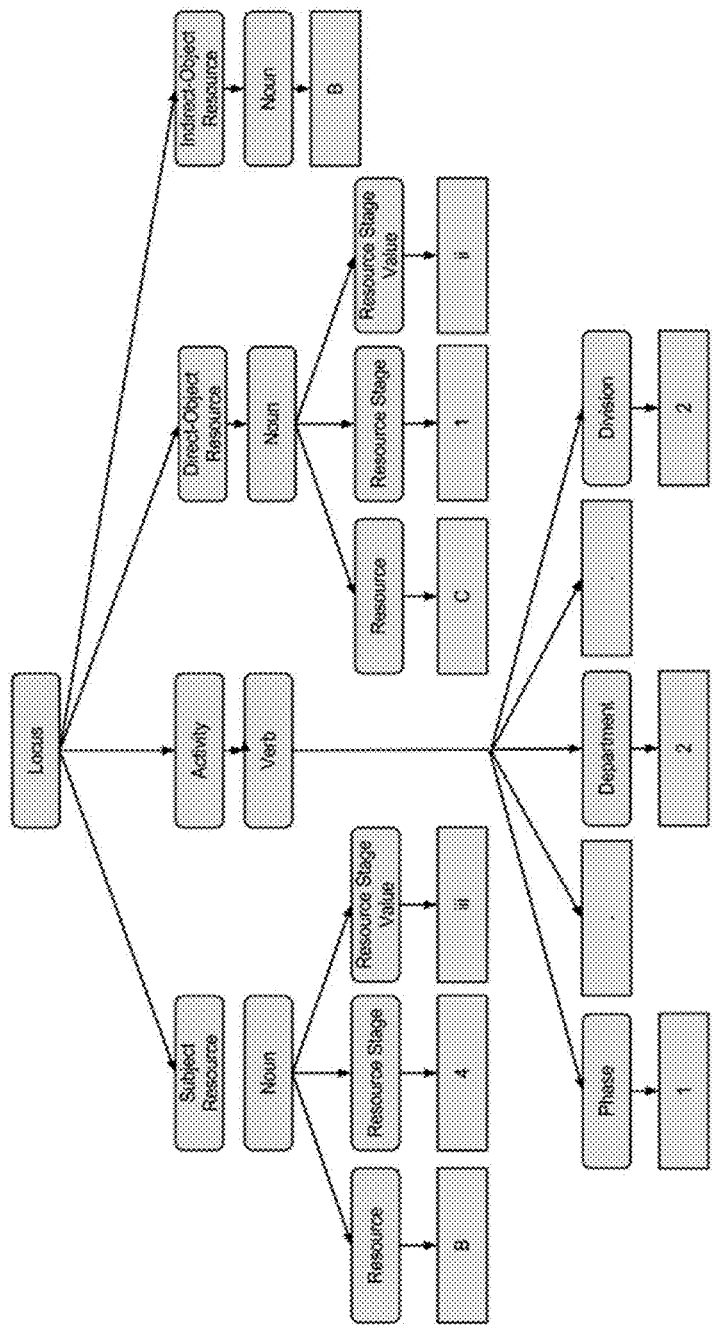
FIG. 9 illustrates example relationships between syntax elements graphically.

An example representation of a syntax is illustrated in FIGS. 8A and 8B. A graphical representation of a syntax is illustrated in FIG. 9.

Portfolio Architecture Creation

Constructing large-scale portfolios of securities is challenging for numerous reasons. It is difficult without both a reliable and validated system of attributes as well as a stratification system that uses a stratified composite hierarchy to control for the different attributes. Independently and together, the systems and methods described herein enable the engineering and management of risk exposure on a large-scale basis.

An engineered composite of investment securities is a group of securities that are engineered (or selected) to possess a different risk/return profile than an uncontrolled grouping from the population of underlying securities or the underlying risk groupings that are used to construct the composite.

Stratified composite portfolios comprising investment securities can be based on a dynamic combination of entities of a similar class to produce a new unit consisting of a part of each of the constituents being combined to create a new entity that has different properties from the underlying constituents taken separately. Dynamic properties mean that the properties of investment securities vary and change over time. Investment composites can be configured to account for this dynamic nature in order to create reliable composites that substantially maintain their properties over time.

A method for building a stratified composite portfolio using a domain-specific syntax for investment securities can include the following steps: 1) group investment securities with common risk attributes; 2) stratify the grouped investment securities into sub-groups that are a) associated with different risks, while b) still associated with the risk characteristics of the group in which they are contained.

In one embodiment, a stratified composite portfolio can include an identification of multiple investment securities and associated weights. As a non-limiting example, the identifications and weights can be executed using a computerized process according to the example method illustrated in FIG. 1. As illustrated in FIG. 1, the method can first generate a stratified portfolio architecture (1125) and then a resultant list of investment securities and weights (1150). In an initial step, a stratification module (1105) can receive as inputs investment security attributes (1120) and a hierarchy of attribute rules (1122), both of which can be stored on one or more computerized data storage devices. As non-limiting examples, the investment security attributes can be selected from those examples provided above in the Definitions. Other attributes and types of attributes can be used.

The attribute rules can be provided by the syntax for the portfolio architecture, as described above. The syntax rules can define relationships between attributes and the investment securities associated with the attributes.

The stratification module (1105) can also include a selection submodule (1110) to receive, as input, a selection from a user of attributes and/or rules (1121). In some embodiments, the rules and/or the structure of the rules may be predefined. For example, a syntax comprising rules for describing companies is illustrated in FIGS. 8A-8B. In other embodiments, a preexisting set of the rules may be edited by a user or the set of rules may be defined by the user. The rules, such as those illustrated in FIGS. 8A-8B, define the relationships between the elements of the syntax. The attributes, selected by the user, are then applied to the syntax. In other embodiments, the user can be provided with an interface for creating new rules (1121) which are then input to the stratification module (1105).

In some embodiments, a rule statement can be a boolean statement in the form of 'attribute' 'operator' 'value' that will return true or false for an entity or its associated investment security based on its attributes. In some embodiments, a rule can be a boolean expressions that combines (via boolean operators) one or more rule statements. The lines in FIG. 9 illustrate example rules.

In some embodiments, a hierarchy of rules can be defined as a relationship between a set of two or more rules that defines the order in which those rules are applied, under the constraint that any entity or its investment security that fails a rule at one node in the hierarchy will not be passed through the rules of any of that parent's children. The stratification submodule (1115) can be configured to create a stratified portfolio architecture (1125) based on the hierarchy of rules (1122), investment security attributes (1120) (optional at this stage), input regarding the creation and selection of rules (1121), or a listing of other identification of investment securities (1131). The stratified portfolio architecture (1125) can then be electronically represented and stored on a computerized data storage device.

A rule can be used as a statement that filters entities and investment securities based on attributes. A hierarchy can be used to define a relationship between rules that specifies the order in which rules are applied. Any company that is excluded from a top level will also be excluded from lower groups. The multiple attribute system described herein can be configured by varying the population in any parent or child by varying one (or more) of the attributes defining that parent or child.

Figure 4:
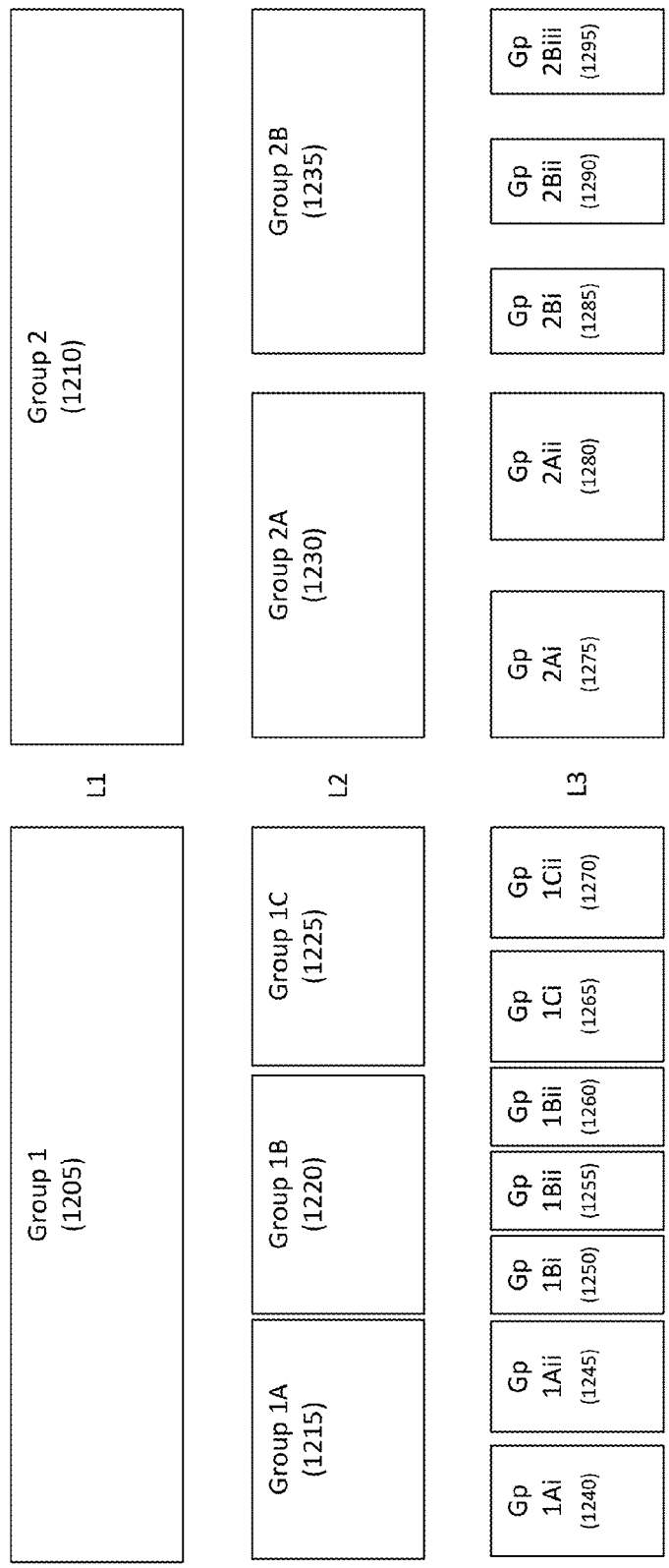
FIG. 4 illustrates an example data set consistent with the example three-level stratification.

Example graphical and textual representations of a resultant stratified portfolio architecture are illustrated in FIGS. 3 and 4. FIG. 3 illustrates example attributes and their syntactic positions. The attribute-based rules illustrated in FIG. 3 are graphically presented in FIG. 4. The rules illustrated in FIG. 3 describe a top hierarchical level composed of two groups having enterprise loci of real estate (1; 1205) and equipment materials manufacturers (2; 1210). The rules in FIG. 3 further describe enterprise loci of real estate developers (1.A; 1215), real estate operators (1.B; 1220), REITs/real estate lessors (1.C; 1225), manufacturers of materials for information-processing equipment (2.A; 1230), and manufacturers of materials for non-information-processing equipment (2.B; 1235). These enterprise loci are illustrated at level two of the stratified architecture. The rules in FIG. 4 include several third-level relationships. The third-level defines relationships for consumer real estate developers (1.A.1; 1240), industrial real estate developers (1.A.ii; 1245) under real estate developers (1.A; 1215); North American real estate operators (1.B.1; 1250), European real estate operators (1.B.1; 1255), and Asian real estate operators (1.B.1; 1260) under real estate operators (1.B; 1220); and low-leverage REITs (1.C.1; 1265) and leveraged REITs (1.C.ii; 1270) under REITs/real estate lessors (1.C; 1225). Further relationships are illustrated under groups (2.A; 1230) and (2.B; 1235), but are not further described here.

Numerous attributes may be used to create a portfolio architecture. The portfolio architecture can include a nested hierarchy of groups. As a non-limiting example, in some instances, these groups can be formed by referencing the attributes which are common to all entities in the universe, such that at each level, every element of the universe is in exactly one group. In some embodiments, these groups may be sub-divided into an arbitrary number of child sub-groups—and this number need not be the same for each of the original parent groups—and this sub-division process can be carried out an arbitrary number of times, each time adding a level to the hierarchy in a "top-down" manner. In some embodiments, stratified composite units are used to build larger stratified composite units, creating a hierarchy in a "bottom-up" manner. In some embodiments, a combination of "top-down" and "bottom-up" approaches may be used. Regardless of the construction method, the resultant stratified portfolio architecture (1125) can comprise an electronic representation of a set of attributes arranged hierarchically according to the defined attribute rules.

Weighting of Investment Securities

A stratified composite portfolio can be constructed of one or more stratified composites that maintain defined risk exposures by weighting the constituents of the stratified portfolio accordingly.

The stratification described herein can be adjusted in various ways to enable a user to control the population of investment securities and thus the outcomes that arise from events associated with a population of investment securities. Biases in the portfolio returns can be created and adjusted based on changes made to any or all of: 1) changes to the population of investment securities; 2) how the population of investment securities is stratified (the portfolio architecture); and, 3) how the stratification units are weighted at arbitrary positions within the stratified hierarchy.

Once the portfolio architecture has been determined, weights can be determined for the investment securities. As a non-limiting example, a weighting function can be any function that, for a specific group in a stratified portfolio architecture, returns a value between 0 and 1 indicating the weight associated with that group relative to its siblings in the stratified portfolio architecture. In some embodiments, the sum of the weighting function for all the siblings at each level can be equal to 1.

In some embodiments, a security's weight is only a function of its position in the hierarchy. As a non-limiting example, weights may be divided evenly between all of the children of a given parent group. That is, if the first level contained 10 groups, each would be given a weight of 10%. If one of these groups contained 4 sub-groups, each would be given a weight 25% of its parent group, for a resultant weight of 25%*10%=2.5%; while if a different top-level group had 5 child groups, each child would weigh 20%*10%=2%. This process can be repeated for each level, eventually yielding a weight for each bottom-level group. A similar process can be applied to securities within each bottom-level group, yielding weights for each security in the universe.

Figure 2:
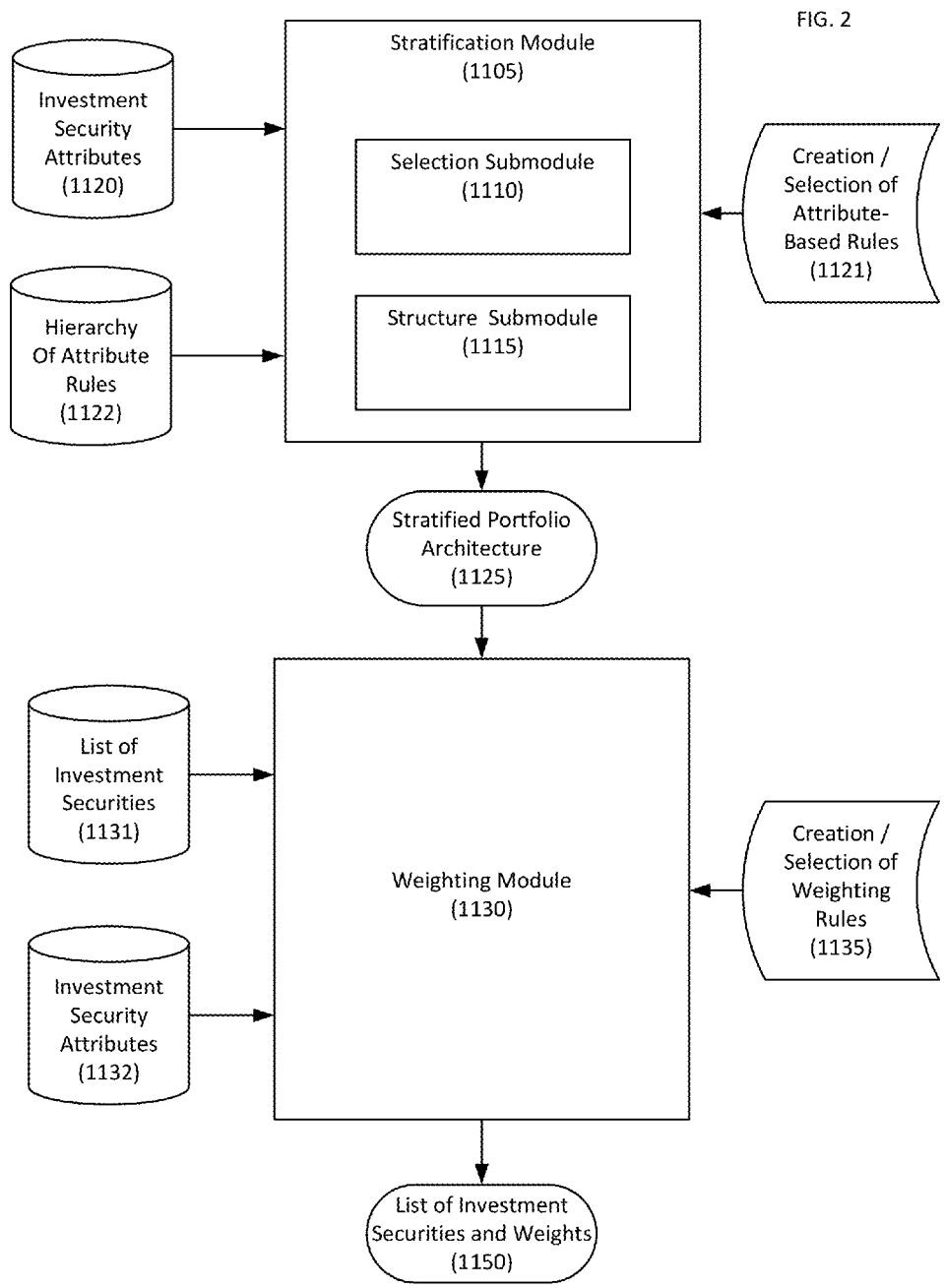
FIG. 2 illustrates an example method for creating a stratified composite portfolio and weighting investment securities.
Figure 6:
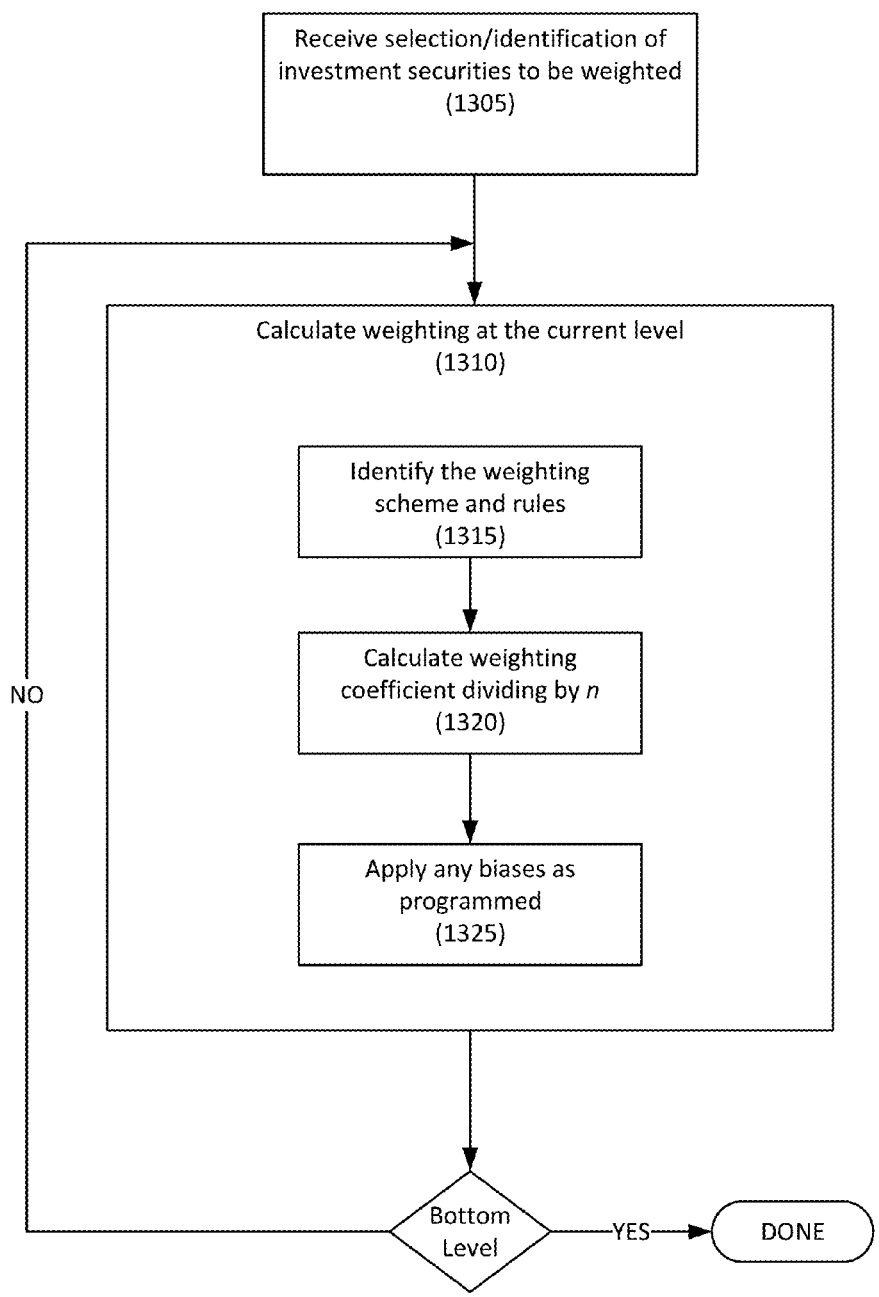
FIG. 6 illustrates an example method for calculating weightings for a stratified composite portfolio.

In some embodiments, the weighting algorithm can be executed by a computer, as follows:
class PortfolioGroup
  # Returns a list of the portfolio groups
  # at the same level as this portfolio group
  def siblings
    . . . .
  end
  # returns a parent of this portfolio group.
  # if this portfolio group does not have a
  # parent, it returns undefined.
  def parent
    . . . .
  end
  # returns the weight that should be associated
  # with this portfolio group.
  def weight
    num_of_siblings=self.siblings.count
    if parent.is_defined?
      parent_weight=self.parent.weight
    else
      parent_weight=100
    end
    return 1/num_of_siblings*parent_weight
  end
end In other embodiments, the weight of any group may be a function of attributes of the companies in that group. As a non-limiting example, groups (formed using any of the attributes) may be weighted by a function of one or more of the attributes common to securities in the universe. As a non-limiting example, groups may be weighted within their parent group proportional to the total debt of all securities in the group. In some embodiments, the function depends on a single attribute. In other embodiments, the function depends on a plurality of attributes. In some embodiments, the same function is used to weight every group in the architecture. In other embodiments, different functions may be used to weight different groups in the hierarchy. In some embodiments, the weighting can be executed by a computer, as follows:
class PortfolioGroup
  # Returns a list of the portfolio groups
  # at the same level as this portfolio group
  def siblings
    . . . .
  end
  # returns a parent of this portfolio group.
  # if this portfolio group does not have a
  # parent, it returns undefined.
  def parent
    . . . .
  end
  # A function that for a specific group in
  # a stratified portfolio architecture returns
  # a value between 0 and 1 indicating the weight
  # associated with that group relative to its
  # siblings in the stratified portfolio architecture.
  #
  # The sum of the weighting function for the
  # siblings at each level equals 1.
  def weighting
    . . . .
  end
  # returns the weight that should be associated
  # with this portfolio group.
  def weight( )
    if parent.is_defined?
      parent_weight=self.parent.weight
    else
      parent_weight=100
    end
    return weighting*parent_weight
  end
end With reference to the example of FIG. 1, computerized weighting module (1130) receives the stratified portfolio architecture (1125). As illustrated in FIG. 2, the weighting module can also be configured to receive identification of investment securities (1131), and identification of investment security attributes (1132) associated with the investment securities. The weighting module can then generate a list of investment securities and weights (1150). The weighting module is illustrated in further detail in FIG. 6. As illustrated, the system can receive a selection and/or identification of the investment securities to be weighted (1305). The investment securities to be weighted could be positioned at any point or points in the stratified hierarchy described above. Weightings for individual securities and groups of securities can then be calculated for the current level (1310). In some embodiments, the calculation can start at the top level of the stratified hierarchy. At the current level, the weighting scheme and rules (1315) for that level are identified. A weighting coefficient can be calculated by dividing the outstanding proportion of weight by n, the number of investment securities or groups of securities (1320). As a non-limiting example, with reference to FIG. 4, the top level weighting may be calculated to be 50% to Group 1 and 50% to Group 2. At the second level, Groups 1A-1C may be weighted at 0.50*0.33=0.165 or 16.5% each.

Before or after calculation of the weightings, any positive or negative weighting biases may be applied (1325). Biases can be applied by addition, subtraction, multiplication, division or other operations on the weightings. Any biases that are applied to one group or investment security require a corresponding opposite bias to be applied elsewhere in the same group or in a peer group at the same level. If the bottom level has been reached and completed, the weighting process may terminate. Otherwise, the process may continue at the next level.

The electronic representation of the weighted investment securities can then be input as instructions to, as non-limiting examples, an exchange traded fund (ETF) or other financial instrument such as a hedge fund, mutual fund, limited partnership or other investment vehicle.

In alternative embodiments, the steps of the method for stratification and weighting can be reordered. For example, the list of investment securities could be introduced anywhere in the portfolio engineering process. Investment securities and/or a reconstitution process could be chosen before stratification to create exposure to a particular universe. Any of a stratification architecture, weighting scheme, and/or rebalancing scheme, could be selected or chosen before or after choosing the investment securities.

Alternative orderings and variations of the steps for creating the portfolio of investment securities described above are possible. For example, with reference to FIG. 1, the identification of investment securities (1131) can be provided to the stratification module (1105). In that arrangement, the stratification submodule can generate the stratified portfolio architecture of investment securities (1125) that is then input to weighting module (1130).

Reconstituting and Re-Weighting

Figure 5:
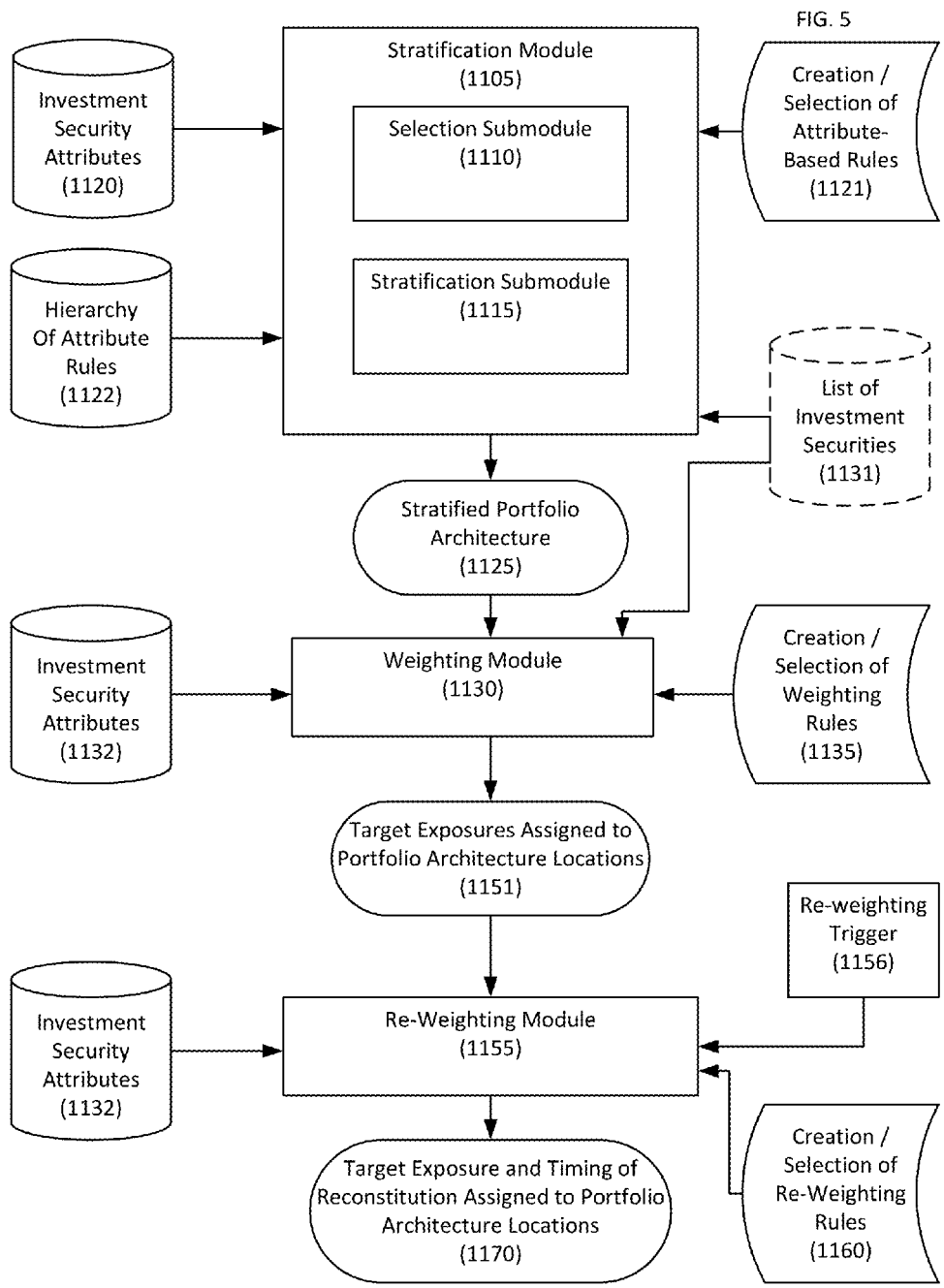
FIG. 5 illustrates an example method for creating a stratified composite portfolio and weighting investment securities.

Additionally, some embodiments can include reconstituting the designated weights on a periodic basis to maintain the desired risk exposures. A stratified portfolio can be comprised of one or more stratified composite units that maintain defined risk exposures by weighting the constituents of the stratified portfolio accordingly and reconstituting the designated weights on a periodic basis to maintain the desired risk exposures. With reference to the embodiments illustrated in FIGS. 1, 2 and 5, the steps illustrated can be performed at any arbitrary point to create a re-weighted portfolio based on modified inputs, such a modified weighting rules. With reference to FIG. 5, in other embodiments, the re-weighting can be provided by a separate re-weighting module (1155). The re-weighting module (1155) receives a list of target exposures assigned to portfolio hierarchy locations (1151). The re-weighting module then selects new investment securities for inclusion in the stratified composite portfolio.

Stratified Composite Portfolio Scoring

Using methods described herein, a score can be calculated for a stratified portfolio. The score can be a characteristic of the portfolio and can be used in multiple contexts. In some embodiments, the target score can be a quantifiable number that the portfolio is desired to reach. In other embodiments, the target score can be a set of attributes that an investor would like the portfolio to have. The portfolio score can be a value or vector of values calculated from the portfolio which can be compared with a target score an investor has for the portfolio. The target score can be a theoretical or estimated value.

A target score can be used as a way to optimize a portfolio. The investor can pick the target score and the system can then be used to build a stratified composite portfolio optimized for that score. Alternatively, a target score can be used to build a portfolio that reflects the performance of the underlying population. That is, the target score can be a measure of how one would expect the population to perform, and the stratified composite can be used to measure the performance of the population. Given a weighted list of investment securities of a portfolio and a target score, the score for the portfolio may be calculated based on derived attributes of a portfolio.

The target score can form an estimate of how the portfolio is expected to perform or how a manager would like it to perform based on its characteristics. The target score can be achieved by measuring the performance of any or all of: individual companies, randomly sampled individual companies, stratification units, and/or composites.

The target score can also be identified as the target score that the investor mandates as part of the investment objective. Here, the investor may want to use a stratified composite to reach a predetermined target score. By building groups based on common attributes, risk groups can be formed. These risk groups may then be weighted appropriately to achieve the target score, resulting in a portfolio with known biases.

In some embodiments, a stratified composite portfolio may be engineered to meet a user-defined target score. As non-limiting examples, a target score could include any or all of: (a) absolute return goals (e.g., expected rolling rates), (b) risk/return measure (e.g., Sharpe ratio, Sortino ratio, or alpha), or (c) risk goal as measured by volatility (e.g., downside deviation or beta). In some embodiments, a target score may be a one- or multi-dimensional vector of values or elements, such as those examples provided above. For example, the target score could be [the actual return—the risk free rate]/[the expected return—the risk free rate] where the target score is greater than or equal to one.

Figure 7:
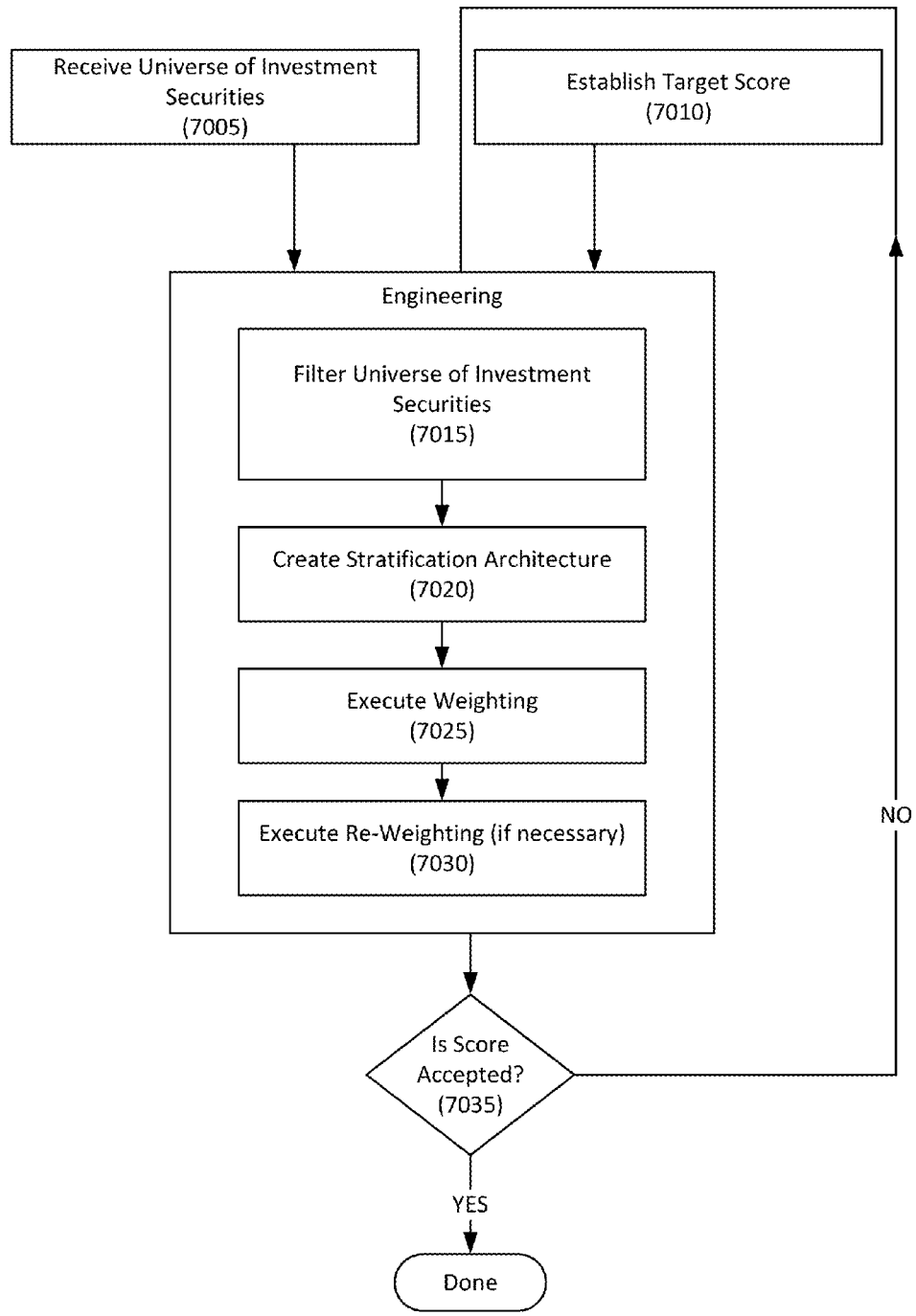
FIG. 7 illustrates an example method for creating a stratified composite portfolio with a target score.

A method for constructing a stratified composite with a target score, according to one embodiment, is described below with reference to FIG. 7. As an initial step, the user establishes population in which to invest by identifying a universe of investment securities (7005). The population could be, for example, financial and energy companies in the U.S. Next, the universe of securities is filtered (7015). The population of companies is then stratified (7020). By this process, they are put into stratification units, hierarchical groupings based on common characteristics.

After population stratification, the metrics are identified that will be used to evaluate the portfolio. The metrics used can be dependent on the population that is being stratified. For example, the metrics used for an investment grade debt portfolio may be expected yield and volatility, while the metrics of an equity portfolio may be expected risk and return. Once the metrics have been identified, a target score can be established (7010). The target score is the goal that the user would like to see the portfolio achieve, the goal being measured by the identified metrics. For example, the target score of an investment grade debt portfolio can be an expected yield and expected volatility that an investor would like the portfolio to achieve. Example embodiments of the target score are described below.

Once the target score is set, an engineered composite portfolio can be created (7020). Composites can be combinations of two or more stratification units. Composites can be engineered to reach the target score. Composites can be engineered by: strategically weighting stratification units and the companies within the stratification units (7025) and reweighting the companies within the stratification units (7030). The weighting and re-weighting process can include changing the population's constituents (adding or deleting constituents from the portfolio that meet the population criteria).

The composite can be tested against the target score (7035). If the target score is accepted, then process can reach completion. If the target score is not satisfied, then some or all of various parameters can be adjusted, including 1) the hierarchy rules (e.g., the architecture), 2) the weighting rules, 3) the universe filtered through the hierarchy and weighted, and 4) the rebalancing/reconstituting policies. The process can be repeated until a portfolio with a satisfactory score is created.

A stratified composite can be used as a way to optimize a portfolio. As described above, an engineered composite can be constructed to meet a target score. Here, the target score can be considered to be the investment objective. For example, the objective could be to build a composite whose return, performance, variance, and/or other quality matches what is outlined in the target score.

Therefore, instead of building a portfolio that is most representative of the underlying population, a portfolio can be created that strategically weights the lower-level groupings so that the portfolio will most closely match its target score. Here, stratifying the portfolio and building composites enables the identification of distinct risk groups within a population. Because these risk groups are identified, weights can be strategically allocated across them in order to meet the target score.

In investment securities, the primary concerns for investors are risk and return. Therefore, in some embodiments, the target score may reflect the investment objectives of the portfolio quantified with respect to the portfolio's risk and return characteristics. The goal in creating investment composites is to engineer the risk and return through composite design and weighting of the underlying constituents. The engineered investment composites can produce composite scores (calculated from combining individual security data impacted by multiple attributes) that can reliably achieve theoretical estimates.

Using the methods described herein, composites can be engineered to improve on these intrinsic properties. Specific properties can be created for use in specific environments. In investment securities, composites can be formed to manage composite scores. A stratified composite can be used to achieve a target score. Stratification allows identified risks to be grouped within a portfolio. Therefore, when creating an engineered portfolio that meets a target score, risks to which the portfolio will be exposed can be better understood qualitatively and quantitatively.

Investment Statistics for Stratified Composite Portfolios

A portfolio generated according to the methods described herein can be scored using modified versions of known statistical analyses, including alpha, beta, and Sharpe and Sortino ratios. A score can be generated based on a normative stratified model portfolio and variations on the normative portfolio. For example, a stratified alpha can be calculated as a risk-adjusted premium to a score on normative stratified portfolio. A stratified beta with respect to a stratified normalized market can also be calculated for a stratified portfolio where the stratified normalized market is defined to have a beta of 1.

In some embodiments, normative stratified betas can be defined contextually in that the market may be defined as a stratified portfolio of a contextual subset of the total market. For example, the contextual subset could be defined, as non-limiting examples, as a sector, industry, geography, time, dictionary terms, etc.

Normative Cases for Stratified Portfolios

Markowitz posits building several portfolios to determine the one that most efficiently represents the group. This process of building individual models to test for the most representative is how normative models are built. In building normative models, there are controls for the underlying population and target scores that are estimated to be achieved from a normative case. In finance theory, this model of portfolio development is posited using portfolios of individual securities. There are inconsistencies raised by the fact that the current normative case for investment securities, the capitalization weighted portfolio, does not achieve a target score or rate of return posited by theory Using the systems and methods described herein, a normative stratified portfolio can be defined. Stratified units can be used as a tool for building normative models and developing normative target scores. Reliable and validated categories of investment securities can be used to sub-divide populations of investment securities to validate normative studies. The user can develop normative scores to test a hypothesis and validate a baseline for use in comparative studies of other stratified portfolios. The system can be configured so that a normative stratified portfolio can be used to derive a target score. A target score for a stratified portfolio, such as a target alpha score, can be defined relative to a baseline normative target score.

At an initial step, a theoretical or estimated score can be defined. Using adjustments based on changes made to any or all of: 1) changes to the population of investment securities; 2) how the population of investment securities is stratified; and, 3) how the stratification units are weighted within the stratified hierarchy, the portfolio can be engineered to: 1) create a representative outcome for a given population (referred to herein as a normative case); 2) an outcome that is biased in a first direction; or, 3) an outcome that is biased in a second direction.

Depending on how the adjustments are made, the bias can be towards a population subset such as a geographic or temporal group or a particular intrinsic attribute class (or subset of an attribute class) within specific population set of investment securities. Within a stratified hierarchy for a given population, a specific bias (or lack thereof) can be managed through the hierarchical structure itself (either through structure or attribute selection) or the weighting assigned to specific hierarchical units.

Non-normative composites are composites that are designed to vary from the normative case. The variance from the normative case is considered to be an engineered or algorithmic alpha. Using the invention, negative variance can be engineered as alpha for a short investment positions. Engineering positive variance can be engineered as alpha for a long investment positions. For example, distributions can be normal (based on the normative case) or non-normative. Non-normative distributions can be positively skewed (to the right of normal), or negatively skewed (to the left of normal).

Adjustments to the weightings, as described above, can be used to generate portfolios having these types of distributions.

Data Set Normalization and Probability Shaping

Financial benchmark indices are often used to evaluate the performance of a financial instrument. The S&P 500 Index is an example of one such benchmark index for stock-oriented funds and the Lehman Brothers Aggregate Bond Index a benchmark index for bond funds. The S&P 500 Index is market cap weighted so that the market value of an individual stock is used to weight the value of that stock in the index. As a result, a change in the market value of a relatively large company has a disproportionate effect on the index. Funds that track these indices also experience the corresponding fluctuations in value as the instruments representing the relatively larger companies fluctuate in value.

Mathematical processing according to the methods described herein can be applied to large sets of economic data to reduce these fluctuations and randomness of the results, such as of investment returns. In some embodiments, multivariate algorithms can be used to organize large datasets. The methods can be used to generate causal connections and perform real-time analyses.

The system can be configured for normalizing the data sets representing investment securities. The normalization process includes statistical categorization based on attributes of the entity associated with the investment security. The attributes used for normalization can be those types of attributes described above, or other attributes relating to the operations and assets of the entity associated with the security.

Multiple investment securities can be organized into statistical categories. A user interface for selecting among the attributes can be provided by the system. The system can include a statistical categories editor (referred to as a thesaurus editor in some embodiments). The statistical categories can be defined within the system using the editor. A statistical category can be defined to be any one or more of the attributes described above, taken alone or in combination with each other. The statistical categories can also be defined based on the syntax and coding systems described above. In some cases, a statistical category can also be a stratified unit.

Bankruptcy Example

The following example illustrates a use case for a composite of investment securities. In this example, a stratified composite portfolio of investment grade corporate debt securities is created.

Investment grade debt is a specific class of securities with a well-defined expected rate of return and a well-defined risk. Each bond is rated by a third-party rating agency. This rating captures the likelihood that the bond issuer will default on the debt. In the case of default risk, one of the most pertinent risks in investing in such securities, corporate bonds with the same rating should have similar yields to maturity, holding other variables, such as maturity, constant. The yield to maturity is the annual rate of return that the bondholder will earn in holding the bond to maturity given the current price of the bond, assuming all payments (coupon payments and face value) are made as expected. Put another way, the yield to maturity is the discount rate that makes the present value of the bond's cash flows equal to the current price of the bond. For all bonds that have a comparable rating from these agencies, the yields for a given maturity date will be the same or within a very tight range. That is, investment grade corporate debt securities behave predictably.

While different investment grade debt securities may have the same probability of default, the event or events that trigger a default vary from issuer to issuer. That is, different companies may face different risk factors relative to specific intrinsic values of the company and its operations. Some of these factors may be unique to that company, while others may be common to groups of companies. Such risks may include industry risk, product risk, customer risk, sensitivity to interest rates, geographic, political, or economic factors outside a company's control, or risks related to the company's CEO or management in general. There are many company specific attributes that can be tied to a company's default risk. These can include, but are not limited to:

1) Financial leverage: Some companies are more or less levered than other companies;

2) Intrinsic operating or asset based attributes: Such attributes are not accounting or performance attributes but rather attributes that define what a company does such as manufacturing, transportation; attributes related to the company's product such as car, computer or couch as well as type of car, computer or couch; attributes related to a company's customer such as consumer or business; attributes related to the customer's customer; attributes related to the geographic location of a business or its individual operations; attributes related to the products and materials a company uses to provide its product; attributes related to any of the multivariate industries or industry segments in which a company may operate; attributes related to the structure of a company's business such as integrated, non-integrated, forward integrated, backward integrated or networked; attributes related to any of the multivariate government or macro-economic risks associated with a specific business or country where a business does business; attributes associated with the accounting or business risks listed by a business as core to their business; risks associated with categorization tied to a specific business or segment by the investment community. At any given point in time any one of these factors or industry events related to these factors may cause or increase the risk of bankruptcy in any specific company;

3) Management or strategy: Companies have unique risks based on its management, its decisions and strategies.

4) Company asset value: Bankruptcy (being one type of default) fundamentally changes the terms of the investment securities issued by a single company. On filing for bankruptcy, the presumption of returns based on ongoing operations changes to include a liquidation scenario and the analysis of the rights of each individual investment security of a company. In this case, investors assess their ability to receive payment on a given security based on the location of that investment security in the capital structure of the issuing company. Investment securities may have been assigned a priority in liquidation. If an underlying property of a company is sold or disposed of, these liquidation priorities designate which security gets which proceeds and when.

Each of these attributes is a potential source of default or bankruptcy risk for a fixed income investor. Some of these attributes may relate to groups of companies (e.g. companies that produce cars, or companies whose operations are located in New Orleans). Because of this, a portfolio that does not control for specific attributes can be inadvertently exposed to a concentration in a specific risk. When a member of a group defaults or files for bankruptcy, other companies in that group may also be impacted.

The invention includes methods for building a stratified composite portfolio of investment grade corporate debt securities in such a way that limits exposure to bankruptcy risks, corporate events, and other such non-systematic risk factors by managing the portfolio's exposure to any particular company or industry. In capitalization-weighted debt portfolios, securities are weighted in proportion to their issuance size relative to the total size of all issues in the portfolio. With such an unmanaged weighting scheme, it is possible for companies or industries that issue large amounts of debt to become over-weighted in the portfolio. If one of these companies or industries has a negative event, such as bankruptcy, then the portfolio itself will be dramatically impacted. A stratified composite portfolio is a tool to limit specific exposure to a calculated amount and to do this for individual companies as well as broad industries or macroeconomic impacts.

The application of the invention to manage risk of default in an investment grade corporate debt portfolio provides an illustration of one embodiment. Each debt security has a level of risk that is directly tied to the value in liquidation of the underlying assets of the company. This risk is distinctly separate from market risks associated with the supply and demand of the debt security itself, as well as from market factors that may impact the rate of return needed for a given investment security at a given point in time, such as the risk free rate at that point in time.

The systems described herein protect against such non-systematic risks across the portfolio; that is, they can reduce or eliminate material impacts of a single security or group of securities. This can be achieved by grouping companies in risk groups (strata) based on non-systematic attributes, e.g. by grouping together companies with similar products, or similar customer bases. Executed properly, stratification ensures that no single non-systematic risk represents a material risk to the portfolio as a whole. In such a stratified composite, bankruptcy risk is spread across enough unique groups to minimize the impact of bankruptcies in any one group or company.

The invention can be used to create strata as follows. For investment grade bonds, there may be three types of causes of a downgrade or bankruptcy: 1) company-specific risk; 2) industry-specific risk; and 3) product-specific risk. Investment-grade bonds of a given rating should have the same probability of downgrade or bankruptcy risk, but this rating provides no information about the probable causes for bankruptcy. And indeed, for bonds of the same rating, the factors that may cause the issuer to default can be radically different. These bankruptcy factors, however, are intimately linked to the intrinsic attributes of the issuing company. Using these attributes, it is possible to group bonds into risk groups based on the properties of their issuers that relate to issuers' bankruptcy factors. This process may be repeated to form a nested hierarchy of risk groups, where each sub-group has its own risk but also has risks associated with the parent group. These risk groups, then, are the strata that may be used to construct a stratified investment composite. By stratifying the investment across these strata, the chance that a negative event in either a single company or industry can severely impact the portfolio can be substantially mitigated.

Industry Risk Example

The following example illustrates an additional use case for stratified composites of investment securities. In this example, a composite of investment securities of equities from the S&P 900 index is created. This composite is a broad-based index comprising large- and mid-cap equity securities issued by US companies from a variety of industries. This universe is a combination of the S&P 500 and S&P 400 indexes, which track large- and mid-cap US companies, respectively. Over periods of time, such a universe of equities should display a consistent return premium relative to a risk-free investment such as US Treasury Bills.

In this example, the returns of the capitalization-weighted S&P 900 are compared with the returns of the same universe of securities engineered into a stratified composite constructed using the method of the invention. Attributes relating to the functional characteristics of these 900 companies are used to create hierarchically nested strata that group functionally similar companies together. These strata are used to determine weights for each security following the methods described herein. The portfolio is rebalanced quarterly, returning each security to its initial weight.

Stratification provides material benefits in environments when specific industries experience large negative price shocks, colloquially referred to as an industry bubble "bursting". As an industry bubble grows, the market capitalization of the companies in the industry grows, thus that industry's weight in the capitalization-weighted portfolio grows. In capitalization-weighted funds, which lack attribute-based controls on the weights of both individual companies and groups of similar companies, such bubbles can create unintended overexposure to specific risk groups, including risks that only impact a particular industry. When the over-weighted industry bubble collapses, the portfolio suffers disproportionately. Even if the companies outside of the industry bubble perform reasonably, the negative returns of the over-weighted companies can result in negative returns for the entire portfolio.

In stratified composite portfolios, however, the risk of industry bubbles can be substantially mitigated by stratifying the universe such that the strata correspond to distinct industry risks. In this manner, industry-specific risks are isolated and cannot induce disproportionately negative performance in the portfolio.

The growth and collapse of information technology equities from 1997 to 2000 exemplifies the benefits of stratified composite portfolios. Using syntactically structured attributes, a group of companies whose business function involves moving, storing, or processing information is defined. Companies in this group include Microsoft, Cisco, Intel, AOL, Qualcomm, and other such information technology companies.

The twenty largest such information technology equities in the S&P 900 grew in weight over the late 1990s such that by the year 2000, they dominated the portfolio. At yearend 1997, 1998, and 1999, these twenty equities collectively weighed 11.8%, 13.7%, and 20.4% of the S&P 900, respectively. In 2000, when the bubble collapsed, these equities fell in value by 42.3%, while the S&P 900 as a whole returned −6.9%. Excluding these information companies, the rest of the S&P 900 returned 6.8%. That is, the "market-wide" downturn in 2000 was not a systematic failure; it was the result of uncontrolled over-exposure to a single industry.

In a stratified composite portfolio, such industry-specific risk can be controlled. In the example stratified composite portfolio, the same twenty information companies were set at a weight of 2.9% and were rebalanced to this weight quarterly. In 2000, this isolated group performed poorly (falling in value by 59.7%), but outside of this group, the example stratified composite portfolio had healthy returns. Excluding these twenty companies, the example stratified composite portfolio returned 21.3%. In total, the example stratified composite portfolio returned 17.6% in the year 2000, outperforming the capitalization-weighted portfolio of the exact same universe by 24.5%.

The performance of the capitalization-weighted S&P 900 against the example stratified composite portfolio of the same universe demonstrates how stratification can prevent non-systematic industry risks from impacting an entire portfolio.

System Architectures

The systems and methods described herein can be implemented in software or hardware or any combination thereof.

Figure 10:
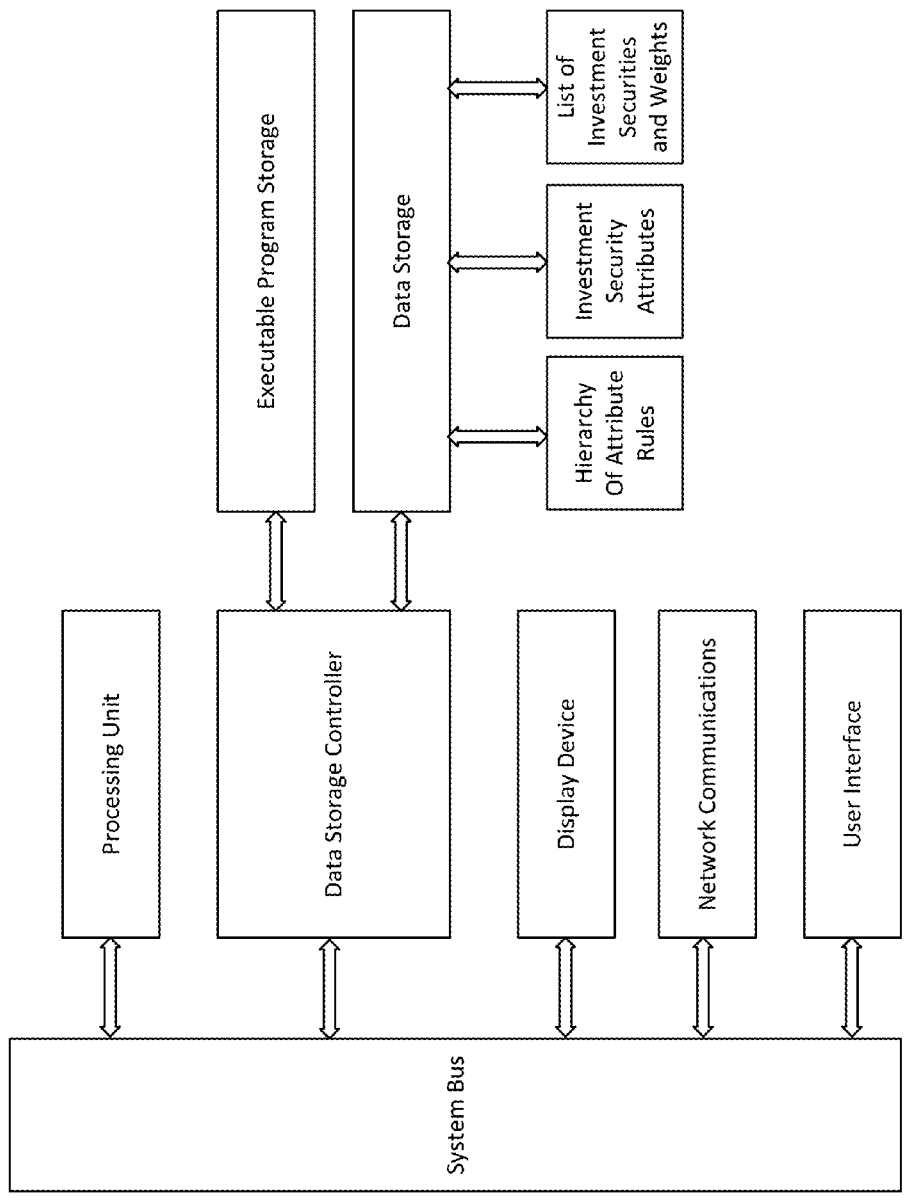
FIG. 10 illustrates an example computerized system for stratified composite portfolio weighting.

The systems and methods described herein can be implemented using one or more computing devices which may or may not be physically or logically separate from each other. Additionally, various aspects of the methods described herein may be combined or merged into other functions. An example computerized system for implementing the invention is illustrated in FIG. 10.

In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

The invention claimed is:

1. A computer-implemented method for constructing a representation of investment securities in a database, the method comprising:
   electronically storing a set of data entities in a database system, each of the data entities representing an investment security, and each investment security corresponding to an economic entity;
   electronically assigning tags representing attributes of the economic entities to a plurality of the investment securities;
   selecting a plurality of investment securities represented by data entities for inclusion in an index, fund, or portfolio of investment securities;
   stratifying the selected investment securities into at least a first stratified group and a second stratified group based on a first common attribute and a second common attribute, wherein the economic entities represented by investment securities in the first stratified group share the first common attribute, as identified by one or more tags, and the economic entities represented by investment securities in the second stratified group share the second common attribute, as identified by one or more tags;
   selecting a stratified group of investment securities;
   stratifying the selected investment securities into at least a first stratified subgroup and a second stratified subgroup based on a third common attribute and a fourth common attribute, wherein the economic entities represented by investment securities in the first stratified subgroup share the third common attribute, as identified by one or more tags, and the economic entities represented by investment securities in the second stratified subgroup share the fourth common attribute, as identified by one or more tags;
   electronically storing the stratified groups and subgroups in a database as a representation of an index, fund, or portfolio;
   electronically accessing the database representation of the stratified groups or subgroups;
   electronically iterating through the accessed representations to compute a negative or positive weight for one or more of the investment securities based on the one or more groups or subgroups into which the investment securities are stratified; and
   assigning and electronically storing the negative or positive weight to the one or more of the investment securities in the database.

2. The method of claim 1, further comprising:
   assigning negative or positive weights to the one or more groups of securities, wherein the sum of the weights of the one or more groups equals 1;
   assigning negative or positive weights to the one or more subgroups, wherein the sum of the weights of the one or more subgroups of the group equals 1; and
   assigning negative or positive weights to the one or more investment securities;
   wherein the sum of the weights of the one or more investment securities of the subgroup equals 1; and
   assigning a negative or positive weight to an investment security by calculating the weight of the security within its subgroup, the weight of the subgroup within its group, and the weight of the group within the portfolio.

3. The method of claim 2, further comprising:
   setting a target weight for a group, subgroup, or investment security; and
   periodically rebalancing the group, subgroup, or investment security to its target weight; and
   wherein the weight for the group, subgroup, or investment security is further based on the number or attributes of groups, subgroups, or investment securities into which the portfolio, index or fund is stratified.

4. The method of claim 2, further comprising transmitting, sending, or relaying information regarding one or more data entities and one or more weights to one of more of an exchange, index provider, index calculator, brokerage, asset manager, investment advisor, fund manager, or securities trading platform.

5. The method of claim 4, further comprising using one or more weights to buy, sell, short sell, or execute trades in a security, composite, group, or portfolio.

6. The method of claim 1, wherein one or more securities, subgroups, groups, or portfolios are equities, bonds, derivatives, commodities, funds, or exchange-traded funds.

7. The method of claim 1, wherein the groups, subgroups, and investment securities comprise a stratified portfolio architecture of clustered investment securities; and wherein the database electronically represents the stratified portfolio architecture, thereby enabling a computer processor to cluster the investment securities and assign weights to the investment securities.

8. The method of claim 1, wherein the investment securities are selected from among equities, bonds, derivatives, commodities, funds, or exchange-traded funds.

9. The method of claim 1, wherein the economic entities represented by investment securities are companies, assets, resources, products, or liabilities.

10. The method of claim 9, wherein the common attributes relate to the inputs, outputs, operations, products, suppliers, customers, or customers of customers of the companies, assets, resources, or liabilities that are represented by the investment securities.

11. The method of claim 1, further comprising:
    receiving, as an input, a target performance metric from a user; and evaluating a portfolio, group, or subgroup to determine or project whether it meets, or is projected to meet, the performance metric; or constructing a portfolio, group, or subgroup so as to achieve the performance metric.

12. The method of claim 11, wherein the performance metric is an expected return, measure of risk, measure of volatility, alpha, beta, or Sharpe ratio.

13. The method of claim 1, wherein a group and its constituent subgroups comprise a stratified composite unit.

14. The method of claim 13, wherein a stratified composite unit is engineered or selected to possess a different risk/return profile than an uncontrolled grouping from the population of underlying securities.

15. The method of claim 1, wherein an index is an uninvested set of investment securities, as represented by data entities, and a portfolio is an invested set of investment securities, as represented by data entities.

16. The method of claim 1, wherein the first and second attributes are different.

17. The method of claim 16, wherein the third and fourth attributes are different from one another and from the first and second attributes.

18. The method of claim 1, further comprising:
identifying additional common attributes as a basis for further stratification into an arbitrary number of strata, wherein each stratum consists of at least two subsets of a set at the higher stratum; and
further stratifying the subgroups based on commonality of attributes.

19. The method of claim 1, wherein the groups or subgroups are stratified to create a more normally distributed performance than a capitalization-weighted, even-weighted, or factor-weighted portfolio, as measured by a commonly accepted statistical test of normality.

20. The method of claim 19, wherein performance is measured by return, expected return, risk, variance, volatility, expected variance, expected volatility, or liquidity.

21. The method of claim 1, wherein the attributes are intrinsic to the underlying economic entity.

22. The method of claim 21, wherein the intrinsic attributes are not factor-based, accounting-based, performance-based, or capital markets-based.

23. The method of claim 21, wherein an intrinsic attribute assigned to a data entity is one that is likely to maintain a constant value over an arbitrary time interval, as validated by a test of statistical significance.

24. The method of claim 1, wherein the intrinsic attribute is associated with the company or issuer's underlying operations, or with a company or issuer in its value chain.

25. The method of claim 24, wherein operations comprise procurement, transportation, storage, research and development, manufacturing, quality control, sales, exchange, banking, investment research, asset management, audit, capital, energy, information, land, real estate, tools, labor, raw materials, simple components, complex components, or other products, final products, resources, assets, liabilities, intermediaries, departments, work groups, suppliers, lenders, investors, stakeholders, customers, customers of customers, counterparties, partners, service providers, inputs, or outputs.

26. The method of claim 24, wherein the underlying operations do not comprise the accounting or capital markets-based representations or metrics of assets, liabilities, inputs, operations, or products of the company or issuer.

27. The method of claim 1, wherein the attributes characterize the roles of each of the economic entities in a process of converting inputs to outputs.

28. The method of claim 27, wherein the attributes are functional.

29. A system for executing a command in a computing environment to construct a representation of investment securities in a database, the system comprising:
a computerized processor configured for:
electronically assigning tags representing attributes of economic entities to a plurality of investment securities;
selecting multiple investment securities represented by data entities for inclusion in an index, fund, or portfolio of investment securities;
stratifying the selected investment securities into at least a first stratified group and a second stratified group based on a first common attribute and a second common attribute, wherein the economic entities represented by investment securities in the first stratified group share the first common attribute, as identified by one or more tags, and the economic entities represented by investment securities in the second stratified group share the second common attribute, as identified by one or more tags;
selecting a stratified group of investment securities;
stratifying the selected investment securities into at least a first stratified subgroup and a second stratified subgroup based on a third common attribute and a fourth common attribute, wherein the economic entities represented by investment securities in the first stratified subgroup share the third common attribute, as identified by one or more tags, and the economic entities represented by investment securities in the second stratified subgroup share the fourth common attribute, as identified by one or more tags;
electronically accessing the representation in the database of the stratified groups or subgroups;
electronically iterating through the accessed representations to compute a negative or positive weight for one or more of the investment securities based on the one or more groups or subgroups into which the investment securities are stratified; and
assigning the negative or positive weight to the one or more of the investment securities in the database; and
an electronic data store configured for:
electronically storing a set of data entities in the database, each of the data entities representing an investment security, the investment security corresponding to an economic entity;
electronically storing the negative or positive weight for the one or more of the investment securities in the database; and
electronically storing stratified groups and subgroups in the database as a representation of an index, fund, or portfolio.

30. The system of claim 29, wherein the computerized processor is further configured for:
assigning negative or positive weights to the one or more groups of securities, wherein the sum of the weights of the one or more groups equals 1;
assigning negative or positive weights to the one or more subgroups, wherein the sum of the weights of the one or more subgroups of the group equals 1; and
assigning negative or positive weights to the one or more investment securities, wherein the sum of the weights of the one or more investment securities of the subgroup equals 1; and
assigning a negative or positive weight to an investment security by calculating the weight of the security within its subgroup, the weight of the subgroup within its group, and the weight of the group within the portfolio.

* * * * *